United States Patent
Kim et al.

(10) Patent No.: US 10,871,781 B2
(45) Date of Patent: Dec. 22, 2020

(54) METHOD FOR DRAWING MAP HAVING FEATURE OF OBJECT APPLIED THERETO AND ROBOT IMPLEMENTING THE SAME

(71) Applicant: LG ELECTRONICS INC., Seoul (KR)

(72) Inventors: Donghoon Kim, Seoul (KR); Byungkon Sohn, Seoul (KR); Hyun Sup Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 15/893,141

(22) Filed: Feb. 9, 2018

(65) Prior Publication Data
US 2018/0239357 A1    Aug. 23, 2018

(30) Foreign Application Priority Data
Feb. 20, 2017   (KR) .................. 10-2017-0022239

(51) Int. Cl.
*G06F 17/00*       (2019.01)
*G05D 1/02*        (2020.01)
(Continued)

(52) U.S. Cl.
CPC .............. *G05D 1/024* (2013.01); *B25J 9/162* (2013.01); *B25J 9/1664* (2013.01); *B25J 9/1697* (2013.01);
(Continued)

(58) Field of Classification Search
CPC ................ G05D 1/024; G05D 1/0274; G05D 2201/0203; G01S 17/931; G01S 7/4802;
(Continued)

(56) References Cited

U.S. PATENT DOCUMENTS 8,386,078 B1 *   2/2013   Hickman .............. G06F 16/182
                                                      700/245
9,141,107 B2 *   9/2015   Ferguson ........... G06K 9/00818
(Continued)

FOREIGN PATENT DOCUMENTS

JP       2009-031884       2/2009
JP       2009031884 A  *   2/2009
(Continued)

OTHER PUBLICATIONS

JP—2009031884-A Translation.*
(Continued)

*Primary Examiner* — Ronnie M Mancho
(74) *Attorney, Agent, or Firm* — Ked & Associates, LLP

(57) ABSTRACT

Disclosed are a method for drawing a map to which a feature of an object is applied and a robot implementing the same. The robot drawing a map to which feature of an object is applied, which comprises a moving unit configured to control a movement of the robot; a map storage unit configured to store the map to be referred while the robot moves; a sensing unit configured to sense one or more objects provided outside the robot; and a controller configured to control the moving unit, the map storage unit, and the sensing unit, and calculate position information and feature information on the one or more sensed objects, wherein the controller of the robot stores the position information and the feature information of the one or more sensed objects in the map storage unit.

19 Claims, 17 Drawing Sheets

(51) Int. Cl.
  *B25J 9/16* (2006.01)
  *G01S 17/89* (2020.01)
  *G01S 7/51* (2006.01)
  *G01S 7/48* (2006.01)
  *G01S 17/931* (2020.01)

(52) U.S. Cl.
  CPC .............. *G01S 7/4802* (2013.01); *G01S 7/51* (2013.01); *G01S 17/89* (2013.01); *G01S 17/931* (2020.01); *G05D 1/0274* (2013.01); *G05B 2219/40506* (2013.01); *G05D 2201/0203* (2013.01); *Y10S 901/01* (2013.01); *Y10S 901/47* (2013.01)

(58) Field of Classification Search
  CPC . G01S 17/89; G01S 7/51; B25J 9/1664; B25J 9/1697; B25J 9/162; G05B 2219/40506; Y10S 901/47; Y10S 901/01
  USPC ......................................................... 700/253
  See application file for complete search history.

(56) References Cited

U.S. PATENT DOCUMENTS

| 9,868,211 | B2 | | 1/2018 | Williams et al. |
| 2012/0069321 | A1 | * | 3/2012 | Quilligan ................ G01S 17/89 |
| | | | | 356/5.01 |
| 2016/0082595 | A1 | * | 3/2016 | Feng ...................... B25J 19/022 |
| | | | | 700/259 |
| 2018/0114436 | A1 | * | 4/2018 | Felix .................... G05D 1/0238 |

FOREIGN PATENT DOCUMENTS

| KR | 10-2014-0038239 | 3/2014 |
| KR | 10-2016-0121373 | 10/2016 |

OTHER PUBLICATIONS

Korean Notice of Allowance dated Oct. 22, 2019 issued in KR Application No. 10-2019-0097430.
Korean Office Action dated Nov. 16, 2018 issued in KR Application No. 10-2017-0022239.

\* cited by examiner

FIG. 4

| Category | Color | Intensity_Min | Intensity_Max | Material_1 | Material_2 | Material_3 |
|---|---|---|---|---|---|---|
| 9 | Black | 85 | 100 | CONCRETE WALL | OPAQUE PLASTIC | |
| 7 | Yellow | 50 | 84 | TRANSLUCENT GLASS | TRANSLUCENT ACRYL | |
| 3 | Red | 11 | 49 | GLASS | ACRYL | |
| 1 | White | 0 | 10 | | | |

221a: {Category}
221b: {rows 7, 3, 1}
221

| Serial | Category | Intensity | StartX | StartY | EndX | EndY |
|---|---|---|---|---|---|---|
| 1 | 7 | 80 | 6 | 6 | 12 | 9 |
| 2 | 7 | 61 | 8 | 8 | 10 | 3 |
| 3 | 3 | 15 | 13 | 13 | 14 | 5 |

225a: {Serial}
225b: {rows 2, 3}
225

| Category | Color | Intensity_Min | Intensity_Max | Material_1 | Material_2 | Material_3 |
|---|---|---|---|---|---|---|
| 9 | Black | 85 | 100 | CONCRETE WALL | OPAQUE PLASTIC | |
| 7 | Yellow | 50 | 84 | TRANSLUCENT GLASS | TRANSLUCENT ACRYL | |
| 3 | Red | 11 | 49 | GLASS | ACRYL | |
| 1 | White | 0 | 10 | | | |
| -1 | Gray | 0 | 10 | IMAGINARY WALL | | |

221

METHOD FOR DRAWING MAP HAVING FEATURE OF OBJECT APPLIED THERETO AND ROBOT IMPLEMENTING THE SAME

CROSS-REFERENCE TO RELATED APPLICATION

This application claims priority under 35 U.S.C. § 119 to Korean Application No. 10-2017-0022239, filed on Feb. 20, 2017, whose entire disclosure is hereby incorporated by reference.

BACKGROUND

1. Field

The present disclosure relates to a method for drawing a map to which a feature of an object is applied and a robot implementing the same.

2. Background

In order for a robot to operate in a space in which human and material exchanges such as airports, schools, government offices, hotels, offices, factories, and the like are active, it is required to prepare a map for the whole spaces. Specifically, it is necessary to sense structures configured with various materials to determine whether the structures are fixed or moving, and to draw a map on the basis of the fixed structures. Specifically, in a space in which a large number of people move, such as an airport, a port, or a train station, a wall is frequently constructed using glass in addition to concrete, and, in the process of sensing the surroundings so as to draw the map, there may occur a case in which the glass is not sensed or the concrete behind the glass is sensed. Thus, in order to resolve such a problem, the present disclosure proposes a method for generating and updating a map by sensing and analyzing a material of a fixed structure in the process of generating or updating the map by a robot.

BRIEF DESCRIPTION OF THE DRAWINGS

The embodiments will be described in detail with reference to the following drawings in which like reference numerals refer to like elements, and wherein:

FIG. 4 is a diagram illustrating features of objects stored in an object feature storage 220;

DETAILED DESCRIPTION

Hereinafter, a robot includes a moving device which has a specific purpose (cleaning, security, monitoring, guidance, and the like) or provide functions according to a feature of a space in which the robot moves. Accordingly, the robot in this disclosure collectively refers to a device which has a moving means capable of moving using predetermined information and a sensor and provides a predetermined function.

Figure 1:
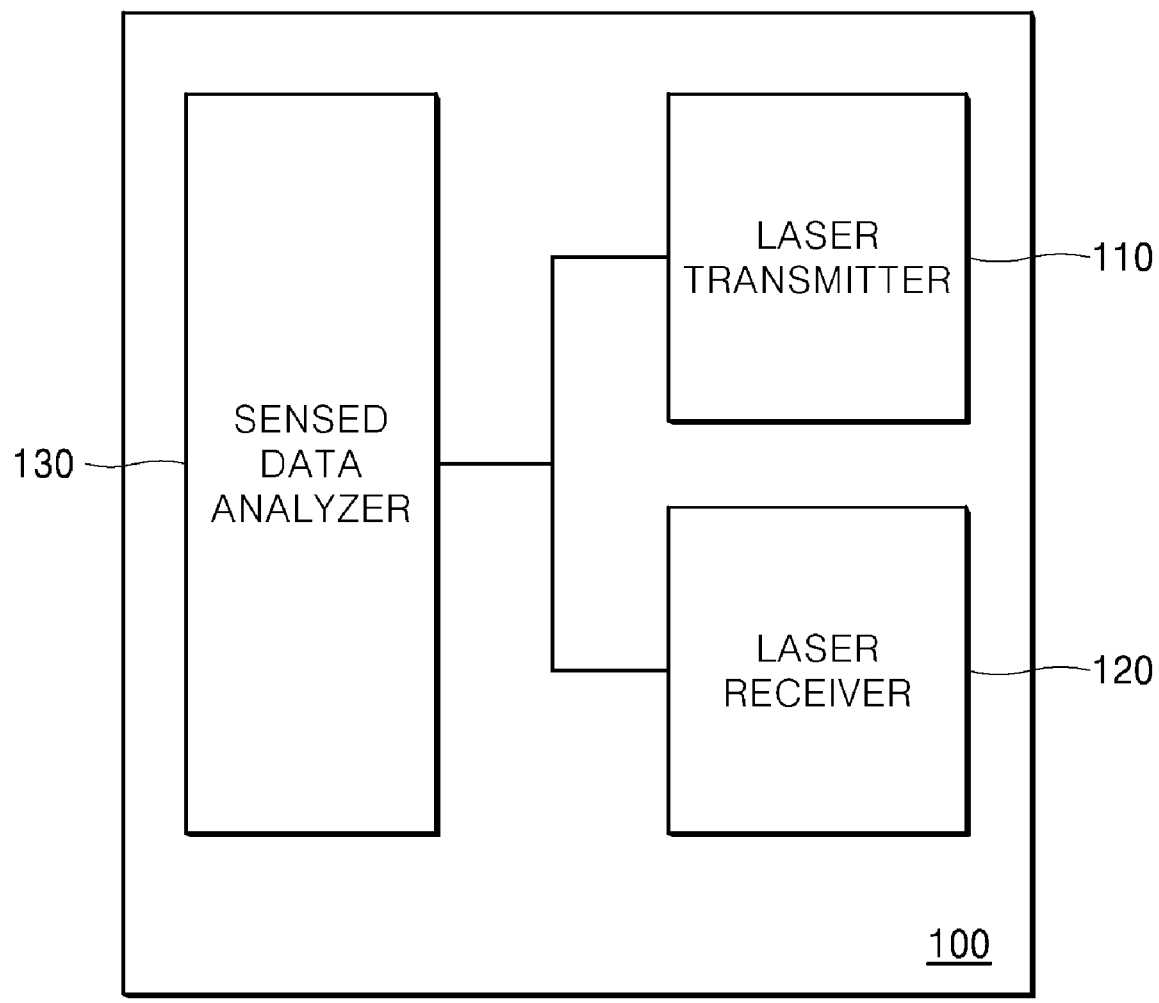
FIG. 1 is a diagram illustrating a configuration of a light detection and ranging (LiDAR) sensor according to one embodiment of the present disclosure.

In this disclosure, the robot may move while holding a map. The map refers to information regarding fixed walls, stairs, glass walls, and the like which do not move in space. Further, the robot may store information regarding specific objects on the map. For example, in the case that an object is a material such as glass which transmits a specific signal, the robot may distinguish and store the object from the wall. Similarly, the robot may store information on materials, such as a mirror and the like, which distort a reflected signal. Since a glass wall provided to extend in an empty space may transmit a sensed signal to inhibit an accurate measurement of a distance, it is necessary to distinguish from, store, display, and use information on objects such as a wall and glass, which are made of different materials, in a space in which the robot moves. FIG. 1 is a diagram illustrating a configuration of a light detection and ranging (LiDAR) sensor according to one embodiment of the present disclosure. A robot according to one embodiment of the present disclosure may complement a map or determine a material of a fixed structure using a LiDAR sensor. The LiDAR may determine a position (distance) or direction to an object, a speed or temperature of the object, a distribution and concentration of a substance, a material, or the like through reflection of a laser emitted toward an external obstacle or a moving object. To this end, a sensing unit (or sensor) 100 including the LiDAR sensor may be constituted with a laser transmitter (or laser) 110 configured to emit a laser and a laser receiver (or laser detector) 120, and be constituted with a sensed data analyzer (or processor) 130 configured to analyze a received signal in addition to the laser transmitter 110 and the laser receiver 120. The laser transmitter 110 may use a laser having a specific wavelength or a laser light source capable of varying a wavelength. The sensed data analyzer 130 may analyze information such as a distance to a sensed object, a temperature or speed thereof, and a material thereof, and the like, and provide the analyzed information to the robot equipped with the sensing unit 100.

In FIG. 1, the laser transmitter 110 and the laser receiver 120 may be integrated to be referred to as a LiDAR sensor. As another embodiment, the LiDAR sensor may include all the sensed data analyzer 130, the laser transmitter 110, and the laser receiver 120.

FIG. 1 illustrates the configuration of the LiDAR sensor using a laser as one embodiment of the sensing unit 100, but the present disclosure is not limited thereto, and the sensing unit 100 may determine materials of external objects, or an intensity of a signal reflected from each of the external objects using various sensors such as an ultrasonic sensor, an infrared sensor, and the like. Alternatively, the sensing unit 100 may determine materials of external objects, or an intensity of a signal reflected from each of the external objects using two or more sensors and by reflecting feature information sensed by each of the sensors.

Figure 2:
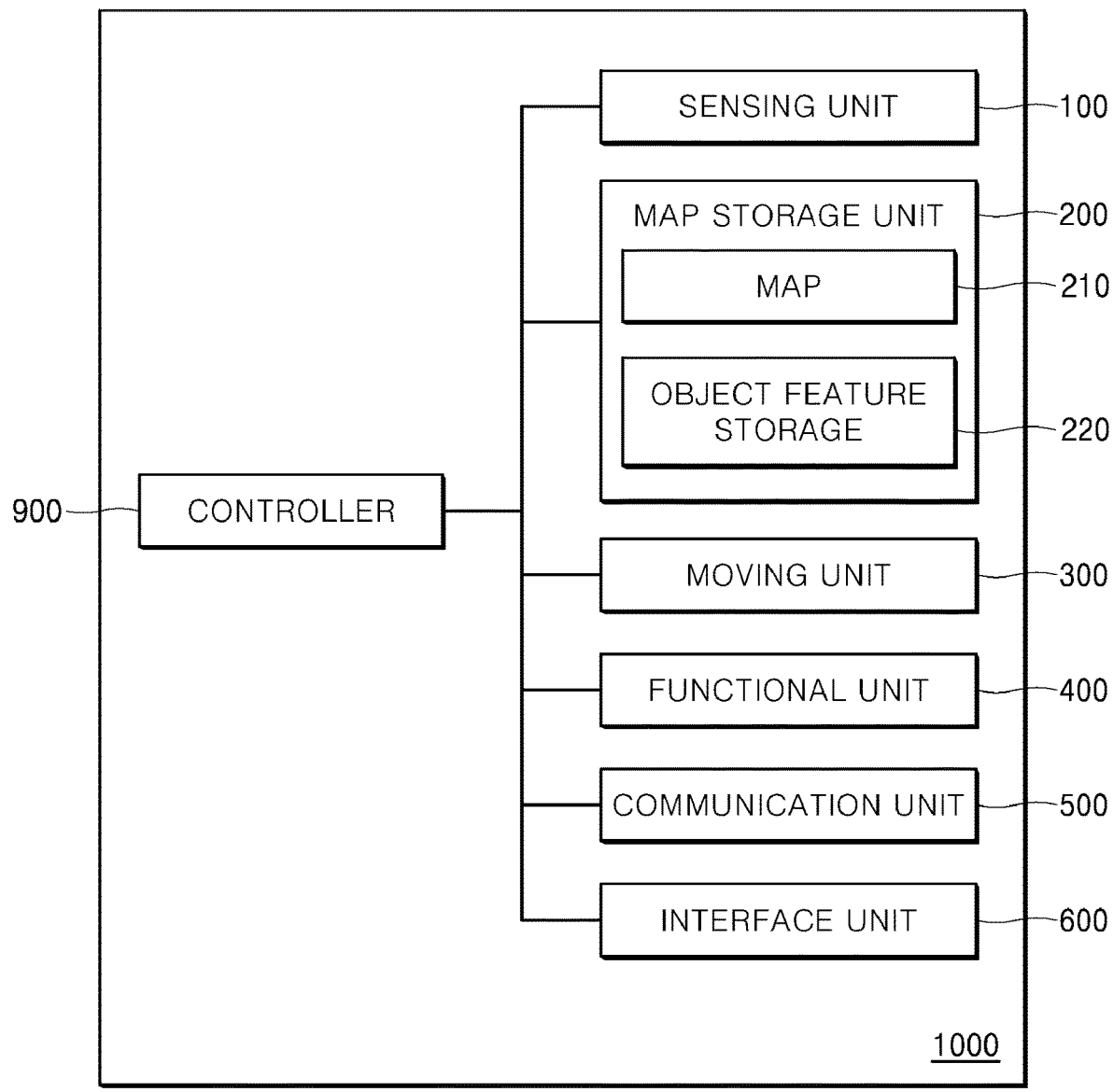
FIG. 2 is a diagram illustrating a configuration of a robot according to one embodiment of the present disclosure.

FIG. 2 is a diagram illustrating a configuration of the robot according to one embodiment of the present disclosure. A robot 1000 includes a sensing unit (or sensor) 100 configured to sense an external moving object or an external fixed object, a map storage unit (or memory) 200 configured to store a map, a moving unit (or motor) 300 configured to control a movement of the robot 1000, a functional unit (or functional module) 400 configured to perform a predetermined function of the robot 1000, a communication unit (or communication interface) 500 configured to transmit and receive information regarding another robot and another map, or the moving object and the fixed object, an interface unit (or user interface) 600 configured to display the information obtained by the robot 1000, and a controller 900 configured to control each of the sensing unit 100, the map storage unit 200, the moving unit 300, the functional unit 400, the communication unit 500, and the interface unit 600.

The controller 900 may collect information sensed by the sensing unit 100 and analyze a material or a feature of the sensed object to store the analyzed material or feature in the map storage unit 200. The moving unit 300 is a means such as a wheel for moving the robot 1000, and moves the robot 1000 under the control of the controller 900. At this point, the controller 900 may determine a current position of the robot 1000 in an area stored in the map storage unit 200, and provide the moving unit 300 with a control signal required for a movement thereof.

Further, the controller 900 may determine whether the external object sensed by the sensing unit 100 is present, and control the movement of the moving unit 300. The functional unit 400 refers to a unit which provides a specialized function of the robot 1000. For example, in the case of a cleaning robot, the functional unit 400 includes components required to perform cleaning. In the case of a guide robot, the functional unit 400 includes components required to perform guidance. The functional unit 400 may include various components according to functions provided by the robot 1000.

The map storage unit 200 includes a map 210. The map 210 refers to information on a space in which the robot 1000 can move. The entire space of the map 210 is divided into unit areas to store information for which the fixed object is provided in the unit area. The map 210 may be used to determine objects provided adjacent to the robot 1000 while the robot 1000 is moving. Further, the map 210 may provide information on a space to a person who manages the robot 1000. Accordingly, the map 210 of FIG. 3 may be information in a memory which is referenced while the robot 1000 is moving, or may be information visually displayed through a predetermined display.

Further, the map storage unit 200 includes an object feature storage 220. The object feature storage 220 stores feature information on the external object obtained in the process of receiving a signal transmitted from the sensing unit 100. For example, feature information on a material of the external object, which is determined through a received signal, may be stored in the object feature storage 220. As one example of the feature information, a signal transmitted by the laser transmitter 110 of FIG. 1 includes a feature of a signal received at the laser receiver 120.

Accordingly, the map storage unit 200 stores information on a category which categorizes the feature information of the object and, as will be described below with reference to FIG. 15, the category may be reorganized by the controller 900. The reorganization of categories is intended to more accurately reflect features of objects present in a space in the process of distinguishing from and displaying the objects present in the entire space according to the categories. Further, since information on the categories allows the robot 1000 to change an operation mode when the robot 1000 moves close to objects belonging to a predetermined category, the categories may be reorganized by reflecting the features of the objects provided in the space.

In the embodiment employing the LiDAR sensor, reflection intensity information of the received signal may vary according to a material of the object reflecting the signal. When the laser is totally reflected, an intensity is strengthened, and, when the laser is partially absorbed or transmitted, the intensity may be weakened. Therefore, even in the objects provided at the same position, the lasers may be received with different intensities according to materials of the objects, and thus the different intensities may be stored as feature information.

In the case of the LiDAR sensor according to the embodiment of the present disclosure, information on objects, i.e., obstacles present in front and rear sides may be mapped using a laser, and thus reflection intensity information on different laser signals may be obtained according to materials, such as glass, a concrete wall, and the like, of the obstacles. In this disclosure, mapping is performed using all distance values for different intensities in addition to sensed distance information instead of using only the sensed distance information such that information on more external objects may be obtained.

Specifically, a different reference symbol (a color, a number, or the like) may be assigned to an object, i.e., an obstacle according to a signal intensity section on a map such that this map may be used as a reference map for classification according to a material of the obstacle and for eliminating unnecessary obstacles.

The moving unit 300 or the functional unit 400 may operate differently by corresponding to feature information of an object provided adjacent to a current position of the robot 1000.

The moving unit 300 moves the robot 1000. The moving unit 300 may include a motor that selectively applies a driving force to a wheel or other moving structure. The moving unit 300 may move under the control of the controller 900, and specifically, the moving unit 300 may move in a different manner according to features of objects provided adjacent to the current position of the robot 1000. For example, when the robot 1000 move to approach an object corresponding to Category 9 (e.g., a wall) in an embodiment of FIG. 3, which will be described below, the moving unit 300 may raise a speed of the robot 1000, and, when the robot 1000 move to approach an object corresponding to Category 3 (e.g., glass), the moving unit 300 may lower the speed of the robot 1000.

The functional unit 400 performs specific operations such as a function of cleaning, a function of security, a function of guidance, and the like. The functional unit 400 may perform different operations according to the features of the objects provided adjacent to the current position of the robot 1000. For example, in the embodiment of FIG. 3, which will be described below, a function performed adjacent to an object (e.g., a wall) corresponding to Category 9 may defer from a function performed adjacent to an object (e.g., glass) corresponding to Category 3.

In summary, the moving unit 300 and the functional unit 400 may operate differently according to a movement direction of the robot 1000 or feature information of the adjacently provided objects.

Figure 3:
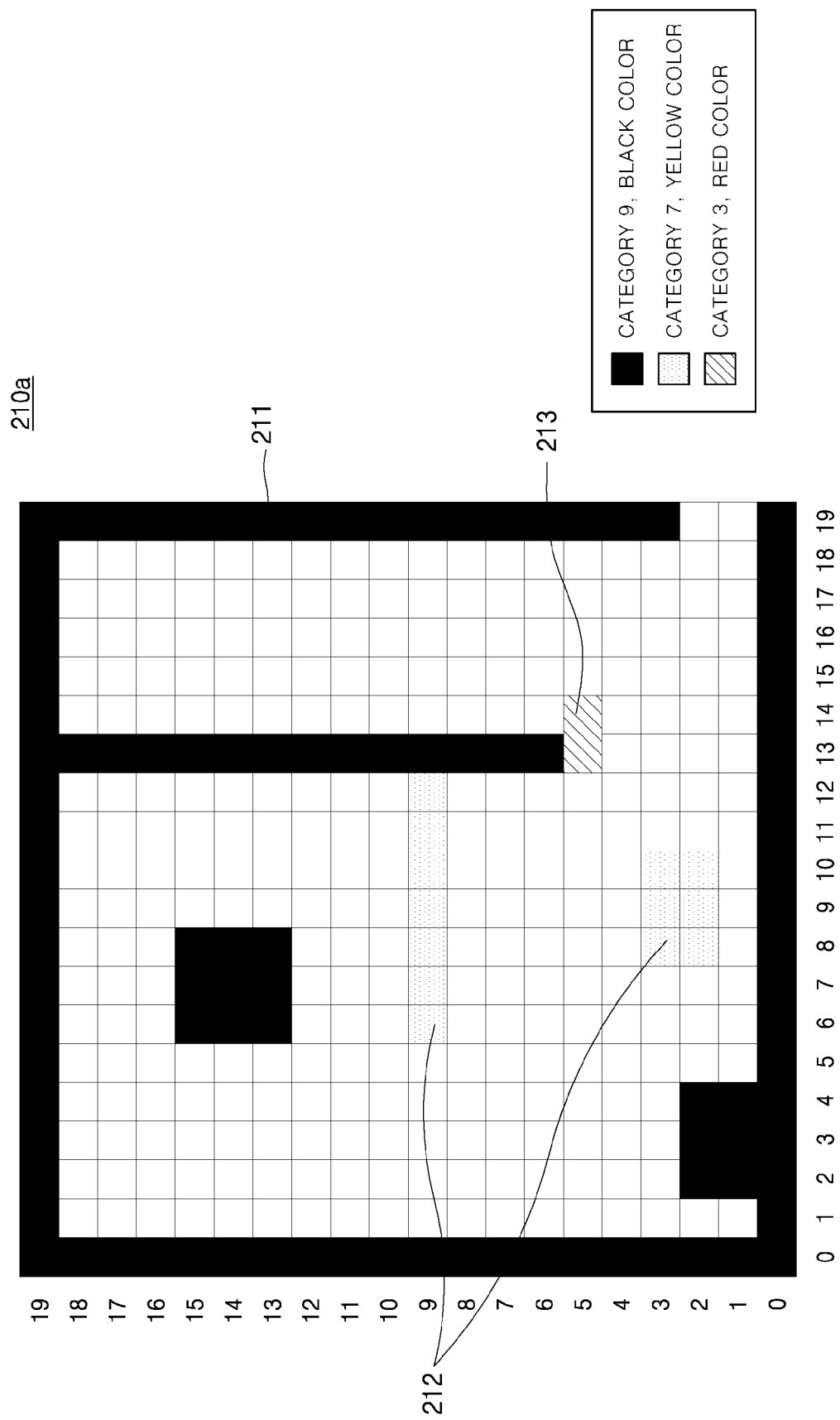
FIG. 3 is a diagram illustrating a configuration of a map stored in a map storage unit according to one embodiment of the present disclosure.

FIG. 3 is a diagram illustrating a configuration of a map stored in the map storage unit 200 according to one embodiment of the present disclosure. The sensing unit 100 described in FIGS. 1 and 2 stores sensed space information while the robot 1000 moves.

A map 210a of FIG. 3 may be configured as a kind of bitmap. Each bit in the bitmap of an image file may be configured to indicate a single unit area. Each unit area may indicate a left bottom as (0, 0) and a right top as (19, 19). Further, the map 210a in FIG. 3 may have a 20×20 data structure. For example, the map 210a may include information on whether an object is provided at each position. When information is provided as a kind of matrix and a fixed object is provided, a value of a corresponding matrix may be set to a predetermined value.

Furthermore, the map storage unit 200 may store feature information on objects in addition to the map 210 composed of fixed objects, and feature information on the objects is stored in the object feature storage 220. The feature information may also be displayed on the map 210.

In the map 210a in FIG. 3, a portion 211 indicated by a black color represents an object made of a material such as a concrete which does not transmit light completely. Meanwhile, a portion indicated as 212 represents an object made of a material such as translucent glass which partially transmits light and partially reflects the light. Further, a portion indicated as 213 represents an object made of a material such as glass having high light transmittance. In the map 210a of FIG. 3, a category value of an object feature of each space may be set in the 20×20 bitmap space.

As one example, there is a method for displaying different colors according to categories of object features in the 20×20 bitmap space. For example, in FIG. 3, the portion indicated as 211 may be displayed in a black color, the portion indicated as 212 may be displayed in a yellow color, and a portion indicated by a reference numeral 213 may be displayed in a red color. Alternatively, as shown in FIG. 3, there is a method for displaying different patterns.

As another example, there is a method for displaying different numbers. Category 9 having a highest intensity may be set to the black portion indicated by a reference numeral 211, Category 7 having an intermediate intensity may be set to the portion indicated by a reference numeral 212, and Category 3 having a lowest intensity may be set to the portion indicated by a reference numeral 213.

FIG. 4 is a diagram illustrating features of objects stored in the object feature storage 220. The object feature storage 220 is divided into a category storage (or category table) 221 configured to store information on a category of an object feature, and a position storage (or position table) 225 configured to store information on a position and an intensity of an object. The category storage 221 may be divided into a field 221a and data 221b, and be variously configured according to a feature of a space in which the robot 1000 travels.

As one example, a category field represents a category of an object feature. As shown in 221b of FIG. 4, four kinds of categories are presented. Further, a color of each category may be set and displayed on the map 210. "Intensity_Min" and "Intensity_Max" refer to a range of reflection intensity. The range of reflection intensity may be set according to a value of an intensity of a reflected signal received by the laser receiver 120 of FIG. 1, and be a newly converted value.

For example, an intensity of a reflected signal may actually have a value in a range of 0 to 100 on the basis of FIG. 4. As another example, an intensity of a reflected signal may actually have a value in a range of 0 to 10000, but the intensity thereof may be converted into a value in a range of 0 to 100. A conversion method may employ a method of dividing an intensity by 100, a method of converting an intensity using a predetermined hash table or a function, or the like. For example, when an intensity of a reflected signal is in a range of 0 to 10000, but an intensity of a meaningful reflected signal is in a range of 3000 to 5000 as a result of traveling of the robot 1000, the intensity of the reflected signal may be converted in a range of 0 to 100 on the basis of the range of 3000 to 5000. As one example, the intensity of the meaningful reflected signal is an intensity which is stored in the map 210 or affects an operation, such as avoidance, of the robot 1000 while the robot 1000 is traveling.

Further, a process of normalizing an intensity of a signal may be added on the basis of a distance between the robot 1000 and an object. That is, since an intensity of a signal when a distance between the robot 1000 and an object is 10 m (meters) differs from that of a signal when a distance between the robot 1000 and the object is 5 m, the intensity of the signal may be converted into an intensity of a signal at a reference distance and be stored in the object feature storage 220.

Material_1 to Material_3 are information on materials of objects corresponding to the respective categories. The information may be set in advance according to a reflection intensity of the laser sensor, or be set on the basis of information sensed by other sensors of the robot 1000 or information provided in advance.

In FIG. 4, there are four categories in 221, and Category 1 refers to an empty space. Category 9 indicates a feature of an object made of concrete, an opaque material, or the like. Category 7 indicates a feature of an object made of translucent glass or translucent acrylic. Category 3 indicates a feature of an object made of glass or transparent acrylic.

Here, the categories may be reorganized on the basis of information sensed by the robot 1000 while the robot 1000 is traveling. For example, when objects are included in Category 7, but there are a large number of objects having specific strength values, a separate category may be added for these objects. That is, when a large number of objects included in Category 7 but having reflection intensities in a range of 50 to 55 are sensed, Category 6 may be newly added.

The position storage 225 stores information on a position and a feature of an object sensed by the sensing unit 100. As one example, all positions of sensed objects, an intensity of a normalized signal, and information on features of the sensed objects are stored. Further, as another example, information on positions and features of objects included in a specific category among the sensed objects is stored.

For example, in FIG. 3, position information on objects included in Category 9 may be basically stored in the map 210*a* such as 211. Further, only information on positions and features of objects included in Category 7 or Category 3 as indicated by the reference numeral 212 or 213 may be stored in the position storage 225. This may be variously applied according to features of objects which are mainly provided in a space.

The position storage 225 of FIG. 4 illustrates an example of position storage (or position table) in which position information on objects indicated by the reference numerals 212 and 213 in FIG. 3 is stored. The position storage 225 is configured with a field 225*a* and data 225*b*. The field 225*a* includes information on Serial, Category, Intensity of a signal, and start points StartX and StartY and end points EndX and EndY of an object. The data 225*b* of the position storage 225 illustrates an example in which information on the positions and the categories of the objects indicated by the reference numerals 212 and 213 in FIG. 3 are stored.

As shown in FIG. 4, the map storage unit 200 stores information of objects by distinguishing from the objects and categories including intensities of signals reflected from the objects. Further, the robot 1000 may distinguish from and display the stored information. That is, the interface unit 600 of the robot 1000 may separately display the information of the objects, which is stored in the map storage unit 200, according to the categories including the intensities of the signals. An example of separately displaying refers that colors are set differently to respective categories. As another example, objects may be displayed in different patterns for respective categories. In FIG. 3, the example in which the objects are distinguished from and displayed with different patterns or colors has been described.

The categories presented in FIG. 4 may be externally set in advance, but the controller 900 and the map storage unit 200 of the robot 1000 may regroup the stored information to divide a specific category in which objects are included into two or more categories, or integrate two or more categories in which the objects are included into a single category.

Further, when a plurality of spaces, such as glass, through which signals transmitted from the LiDAR sensor pass are provided as a constitutional feature of a space, it is possible to recognize the glass as a wall such that a case in which an erroneous value is obtained or is not obtained according to a material of an external object such as an obstacle can be prevented. Furthermore, accurate map information may be generated by implementing such a robot.

Figure 5:
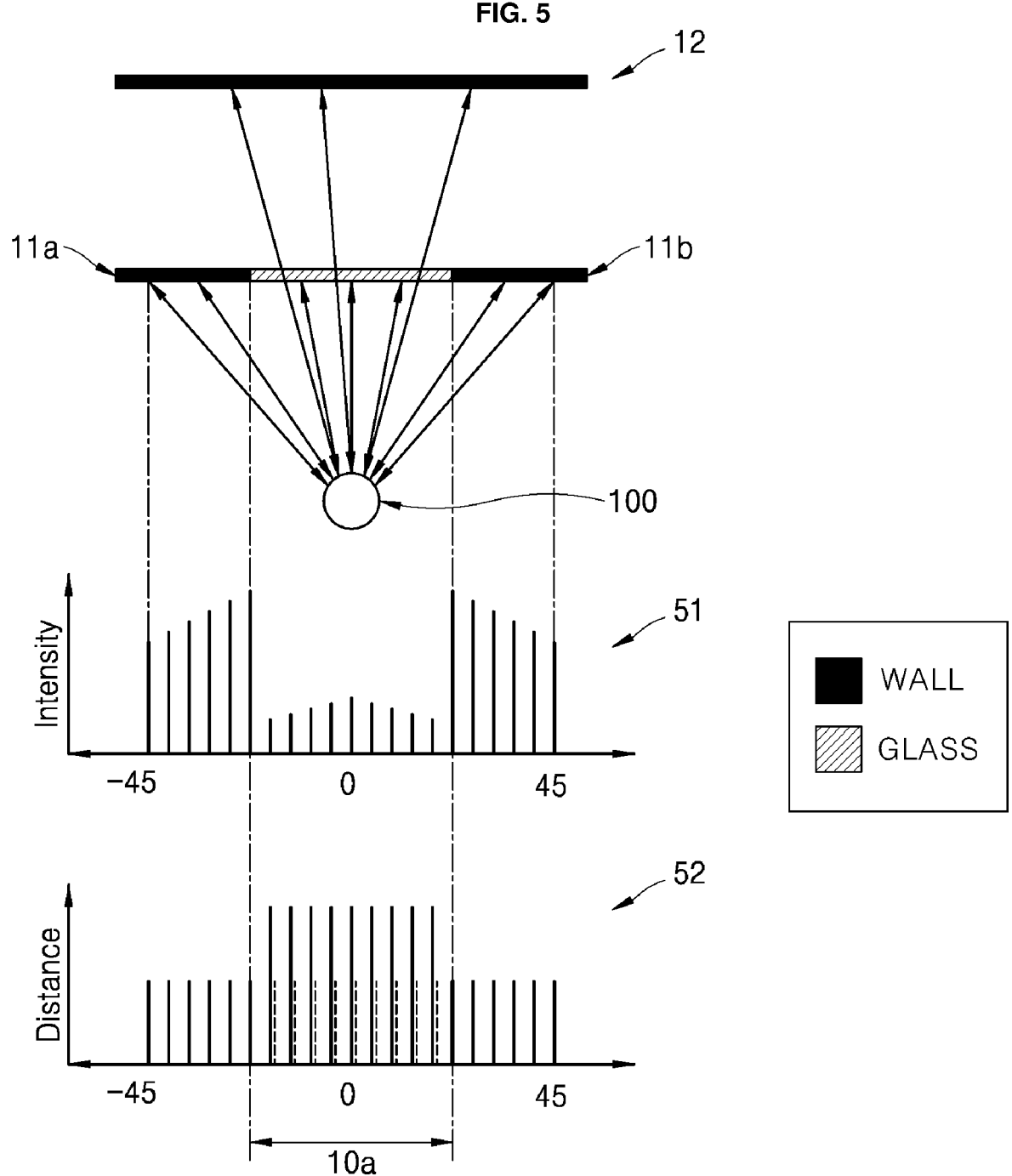
FIG. 5 is a diagram illustrating a process in which the robot according to one embodiment of the present disclosure distinguishes walls from glass using a signal intensity in a space in which the walls and the glass are provided.

FIG. 5 is a diagram illustrating a process in which the robot according to one embodiment of the present disclosure distinguishes walls from glass using a signal intensity in a space in which the walls and the glass are provided. A configuration in which the sensing unit 100 transmits and receives signals in a range of 180 degrees to and from a front side will be described. The sensing unit 100 transmits signals sequentially or simultaneously in the range of 180 degrees in the front side and receives the signals reflected from an external object. An intensity of the signal is high in an area in which the signal transmitted by the sensing unit 100 does not pass through, such as the walls 11*a*, 11*b*, and 12, and the intensity thereof is low in an area in which the signal transmitted by the sensing unit 100 partially passes through.

The intensities of the signals sensed by the sensing unit 100 are displayed as a graph 51 at a lower side. For convenience of description, intensities of the sensed signals of objects in a range of −45 degrees to +45 degrees around the sensing unit 100 are shown. Intensities of signals in an area 10*a* in which the signals are reflected from the wall 12 provided behind a glass 10 by passing therethrough and some of the reflected signals are received, and also some of the signals which do not pass through the glass 10 are received are less than those of signals reflected from the walls 11*a* and 11*b* in front of the wall 12.

Meanwhile, distances of the signals sensed by the sensing unit 100 are displayed as a graph 52 at the lower side. For convenience of description, the sensed distances of the objects in the range of −45 to and +45 degrees around the sensing unit 100 are shown. The distances from the wall 12 provided behind the glass 10 are calculated by passing through the glass 10. Further, according to the configuration of the sensing unit 100, distances through some of the reflected signals which do not pass through the glass 10 may also be calculated as dotted lines in the area 10*a*. The distances of the signals may be displayed with corrected values by reflecting angles around the center of the sensing unit 100 as shown in the graph 52.

In the example of FIG. 5, information on the intensities and distances of the signals sensed by the sensing unit 100 may be transmitted to the controller 900, and the controller 900 may store object information on the map storage unit 200 on the basis of the sensed information on the external objects. It can be determined that the glass 10 is provided at the area 10*a* by comparing the intensities and distances of the signals reflected from a portion in which the intensities of the signals become weak and a portion in which the distances of the signals distance become long.

As one example, when intensities of the signals, which are expected in the absence of the glass 10, are less than or greater than the intensities of the signals in the area 10*a*, the controller 900 may determine that an object causing distortion of the intensities by transmitting or reflecting light is provided between the wall 12 and the sensing unit 100. Further, the signals indicated by the dotted lines in the graph 52 may also be factors for determining that the glass 10 is provided through distances of weak signals reflected from the glass 10 in the area 10*a*.

In the structure as shown in FIG. 5, the controller 900 and the map storage unit 200 may correct and store the intensities and distances of the signals. In the area at which the glass 10 is provided, both the glass 10 and the wall 12 provided behind the glass 10 may be stored in a map.

Figure 6:
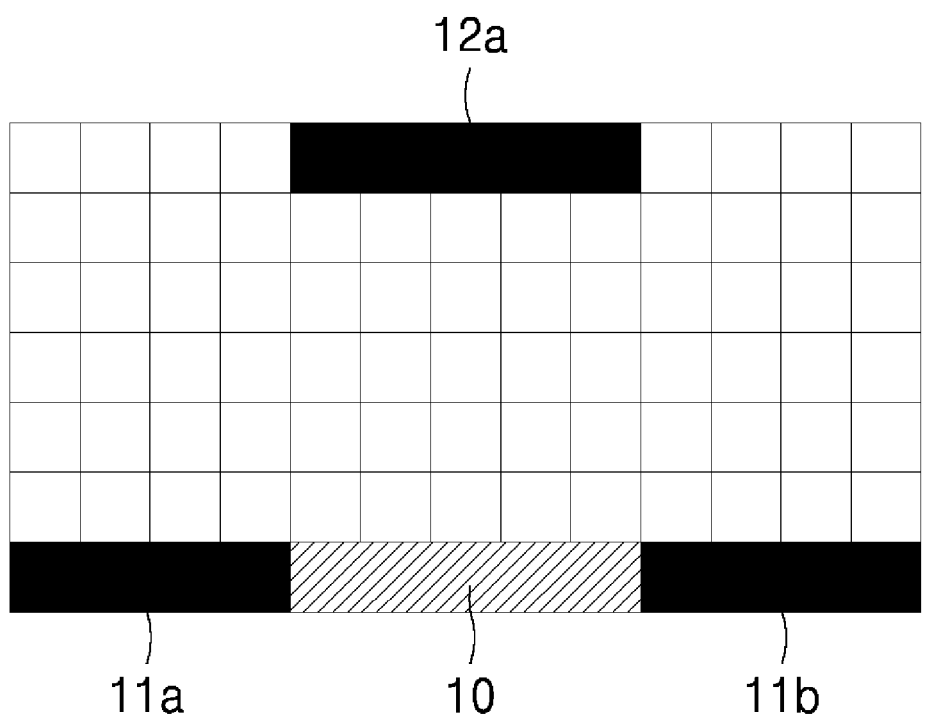
FIG. 6 is a diagram illustrating the objects which are sensed in FIG. 5 and are stored in the map storage unit 200 according to one embodiment of the present disclosure.

FIG. 6 is a diagram illustrating the objects which are sensed in FIG. 5 and are stored in the map storage unit 200 according to one embodiment of the present disclosure. Only a portion 12*a* of the wall 12 of FIG. 5 is displayed in a map 210*b* since distances of some portions of the wall 12 are not sensed due to the walls 11*a* and 11*b* in front of the wall 12. Further, the glass 10 is stored in the map 210b to be displayed different from the walls 11a, 11b, and 12a.

Furthermore, since objects provided in the space and made of materials (glass in FIGS. 5 and 6) different from those of the objects 11a and 11b provided in an adjacent area may be easily removed, information on sensing times with respect to objects included in a specific category may be additionally stored.

For example, a field of "SensingTime" may be added to the position storage 225 of FIG. 4, information on a sensing time of a corresponding object may be continuously updated, and whether the corresponding object of which sensing time has passed for a predetermined time is removed may be newly sensed and updated.

Specifically, a new space may be partitioned using glass or an existing space may be removed in places such as the airport, the terminal, and the like where a floating population is large and a space partition is frequently changed, so that, when an object is not determined as an object included in a category which is not easily removed as concrete, the object may be determined as a floating object and thus whether the object is still provided may be determined periodically or on the basis of a specific time.

Like the LiDAR sensor, when the information on the intensity and distance of the signal may be simultaneously obtained in the process of sensing an external object, information on the external object may be obtained in detail using the information on the intensity and distance of the signal. That is, when mapping is performed using all distance values with respect to different intensities according to a material of an object such as an obstacle, obstacle information may be further obtained.

Further, as described in FIG. 4, areas with respect to the intensities of the signals are grouped as a category, and colors, numbers, and hatched patterns are assigned to obstacles to use the categorized areas and the obstacles as reference data for classifying the obstacles according to materials thereof and removing unnecessary obstacles such that a more accurate map can be drawn.

Figure 7:
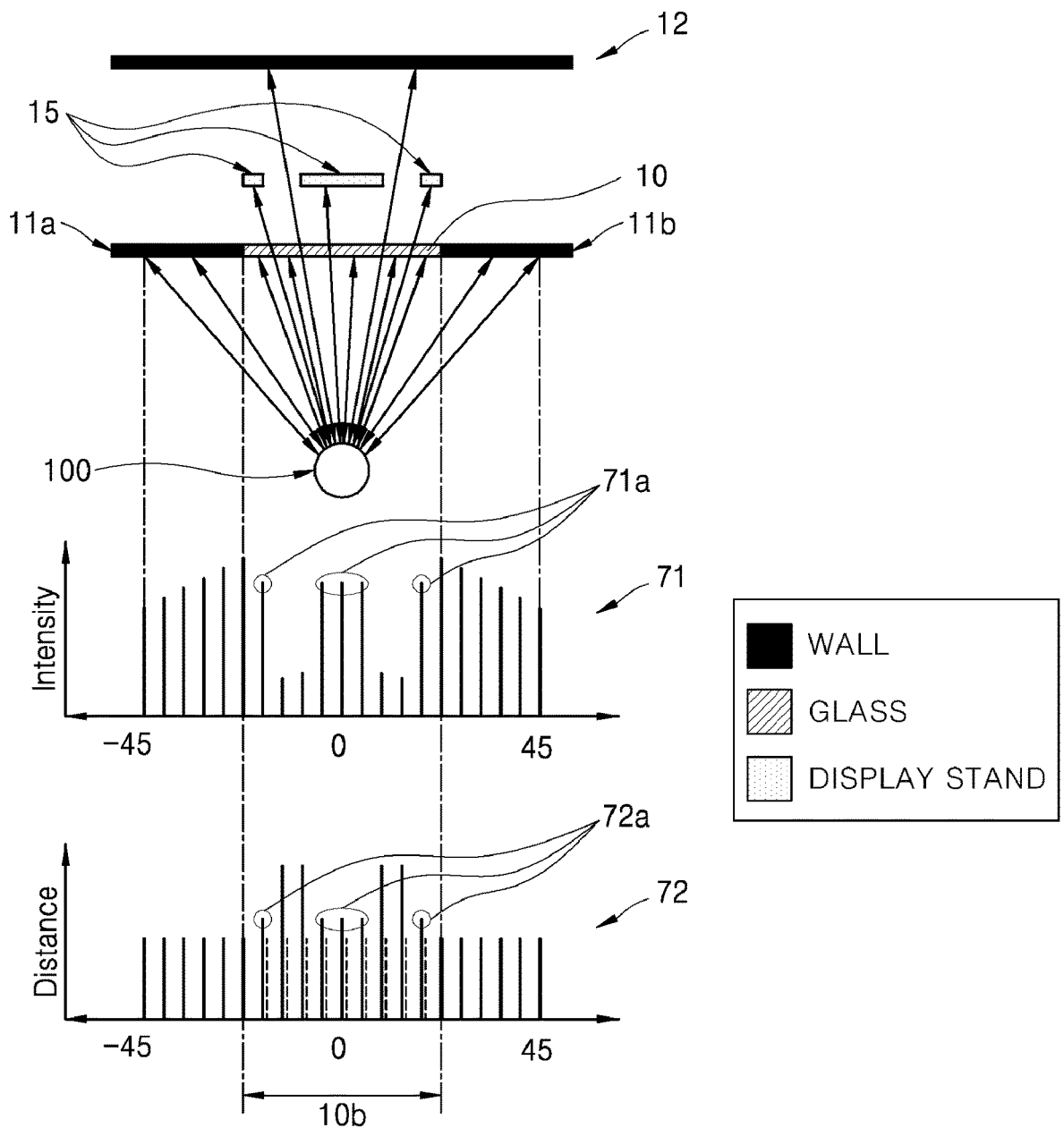
FIG. 7 is a diagram illustrating a process in which a robot according to another embodiment of the present disclosure distinguishes glass from objects provided behind the glass.

FIG. 7 is a diagram illustrating a process in which a robot according to another embodiment of the present disclosure distinguishes glass from objects provided behind the glass. Unlike the configuration shown in FIG. 5, a plurality of display stands 15 are provided behind the glass 10. Therefore, intensities and distances of signals reflected from the display stands 15 are different from those described in FIG. 5.

The intensities of the signals reflected from the display stands 15 correspond to a portion 71a in a signal intensity graph 71. The distances measured from the display stands 15 correspond to a portion 72a in a signal distance graph 72. Dotted lines in the portion 72 refer to distances from the glass 10. The controller 900 may store information on the glass 10 and the wall 12 provided behind the glass 10 without storing information on the display stands 15 in the process of storing sensed information as shown in the signal intensity graph 71 and the signal distance graph 72 in a map. When the signals rapidly vary within a short range in an area 10b of each of the signal intensity graph 71 and the signal distance graph 72, the controller 900 may store the area 10b in the map storage unit 200 as the intensities and distances of the signals vary since various objects are provided behind the glass 10. In FIG. 7, the sensed objects stored in the map storage unit 200 may be the same as those shown in FIG. 6.

Figure 8:
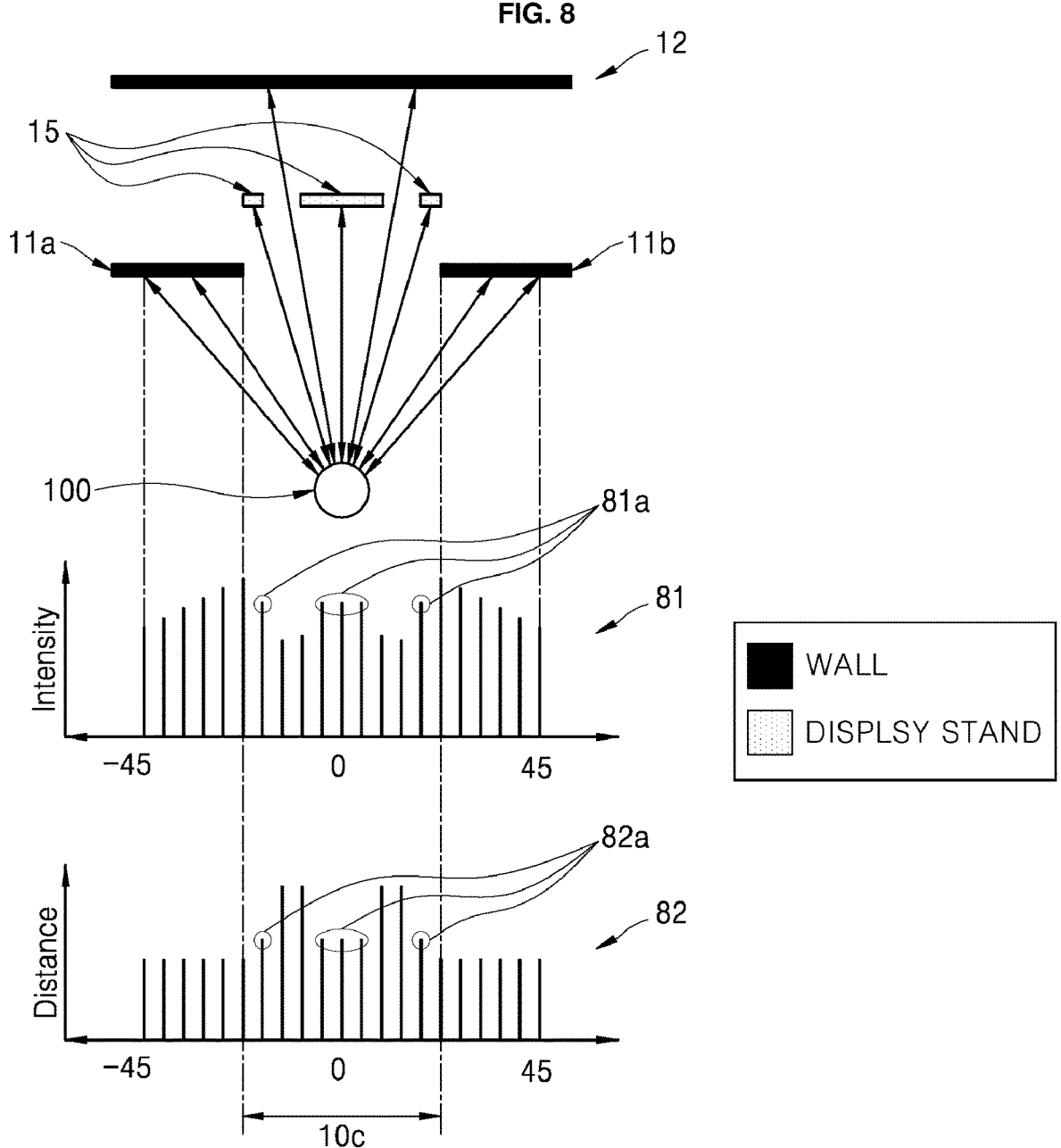
FIG. 8 is a diagram illustrating a process in which a robot according to still another embodiment of the present disclosure distinguishes from various objects provided in an open space in which no glass is present.

FIG. 8 is a diagram illustrating a process in which a robot according to still another embodiment of the present disclosure distinguishes from various objects provided in an open space in which no glass is present. Unlike the configuration shown in FIG. 7, FIG. 8 illustrates an embodiment in which a plurality of display stands 15 are provided, but an object such as glass or a wall is not provided in front of the display stands 15. Therefore, intensities and distances of signals reflected from the display stands 15 are different from those described in FIG. 7.

The intensities of the signals reflected from the display stands 15 correspond to a portion 81a in a signal intensity graph 81. The distances measured from the display stands 15 correspond to a portion 82a in a signal distance graph 82. Unlike FIG. 7, distances to the glass 10 are not shown in the signal distance graph 82.

The controller 900 may store information on an extending section of the adjacent walls 11a and 11b and the wall 12 provided behind the adjacent walls 11a and 11b without storing information on the display stands 15 in the process of storing sensed information as shown in the signal intensity graph 81 and the signal distance graph 82 in a map. The controller 900 may determine that objects hindering a movement of the robot 1000 are not present between the sensing unit 100 and the display stands 15 through the signal intensity graph 81 and the signal distance graph 82.

However, when the intensities of the sensed signals are different from the intensities of the sensed signals from the walls 11a and 11b even after a distance correction, and distances between the display stands 15 and the walls 11a and 11b are determined to be present within a preset value, the controller 900 may control the robot 1000 so as not to enter up to the display stands 15 and store an imaginary object as being present in the extending area from the walls 11a and 11b in the map storage unit 200.

In this case, the controller 900 may store imaginary glass as being present between the left front wall 11a and the right front wall 11b in the map storage unit 200. Alternatively, the controller 900 may store information on an imaginary boundary line instead of the imaginary glass in the map storage unit 200.

Figure 9:
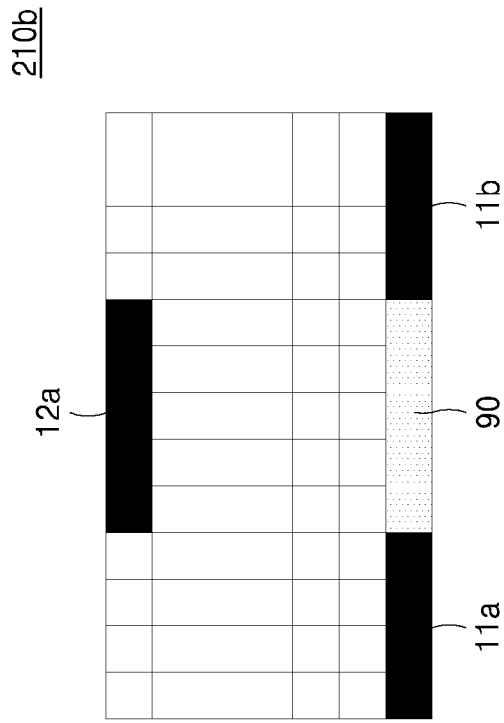
FIG. 9 is a diagram illustrating an imaginary boundary line which is stored in a map storage unit according to one embodiment of the present disclosure.

FIG. 9 is a diagram illustrating an imaginary boundary line which is stored in the map storage unit 200 according to one embodiment of the present disclosure. An area indicated by a reference numeral 90 represents an imaginary boundary line, i.e., an imaginary wall in a space between the left front wall 11a and the right front wall 11b of FIG. 8. Similarly, information on Category "−1" corresponding to the imaginary wall is stored in the category storage 221. The area having Category "−1" may be recognized as a space in which objects are not provided but the robot 1000 does not enter, and the robot 1000 may operate with respect to the area 90 in the same manner as a wall is provided while the robot 1000 is traveling.

In the above-described embodiments of the present disclosure, the robot 1000 may draw the map (a color, a pattern, or the like) distinguishing from material features of externally provided objects to discriminate obstacles. Further, the robot 1000 may generate a map reflecting material features of the obstacles and may be used in various applications in which map information needs to be utilized. For example, when the robot 1000 needs to operate by discriminating a wall from glass while the robot 1000 is traveling, the robot 1000 may move according to the classified information on the objects having different features stored in the map.

In summary, the controller 900 of the robot 1000 may store information on imaginary objects, which are not sensed, in the map storage unit 200. As one example, the imaginary object is stored in the map storage unit 200 as if there is an obstacle virtually due to adjacent objects (such as display stands) even though an object such as an imaginary wall is not provided at a corresponding position.

Figure 10:
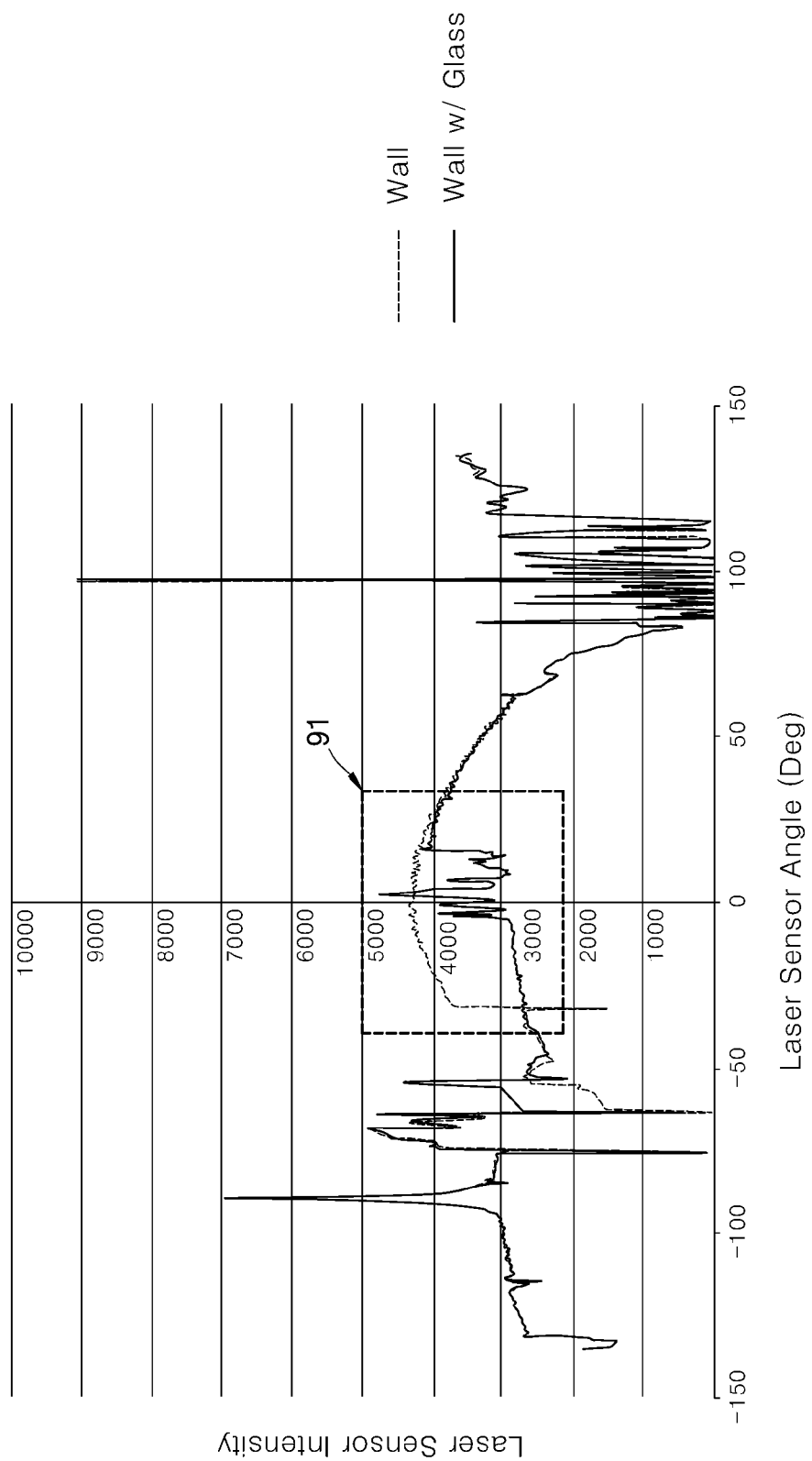
FIG. 10 is a graph illustrating variation in intensity of signals in a case in which a sensing unit 100 of the robot according to one embodiment of the present disclosure senses a glass wall.

FIG. 10 is a graph illustrating variation in intensity of signals in a case in which a sensing unit 100 of the robot according to one embodiment of the present disclosure senses a glass wall. Unlike a case in which a wall is provided (Wall), in a case on which a glass wall is provided (Wall w/Glass), it can be determined that intensities of signals are unevenly varied in an area as indicated by a reference numeral 91. This shows a case in which an object causing reduction in intensity of signals is provided such that glass is provided between walls or in front of the walls.

When the sensing unit 100 senses information as shown in FIG. 10, it can be seen that objects made of materials different from concrete are provided, so that information on the objects made of different materials may be separately stored in the map storage unit 200 and may be referred when the robot 1000 moves.

Further, the information to which the materials of the objects are reflected may be shared with other robots or sent to a central server. This may serve as a basis for the central server in determining the features of the objects constituting a space. Furthermore, as described in FIG. 4 in consideration of an error or a range of the reflection intensities of the signals, the features of the objects may be grouped by applying categorization.

Figure 11:
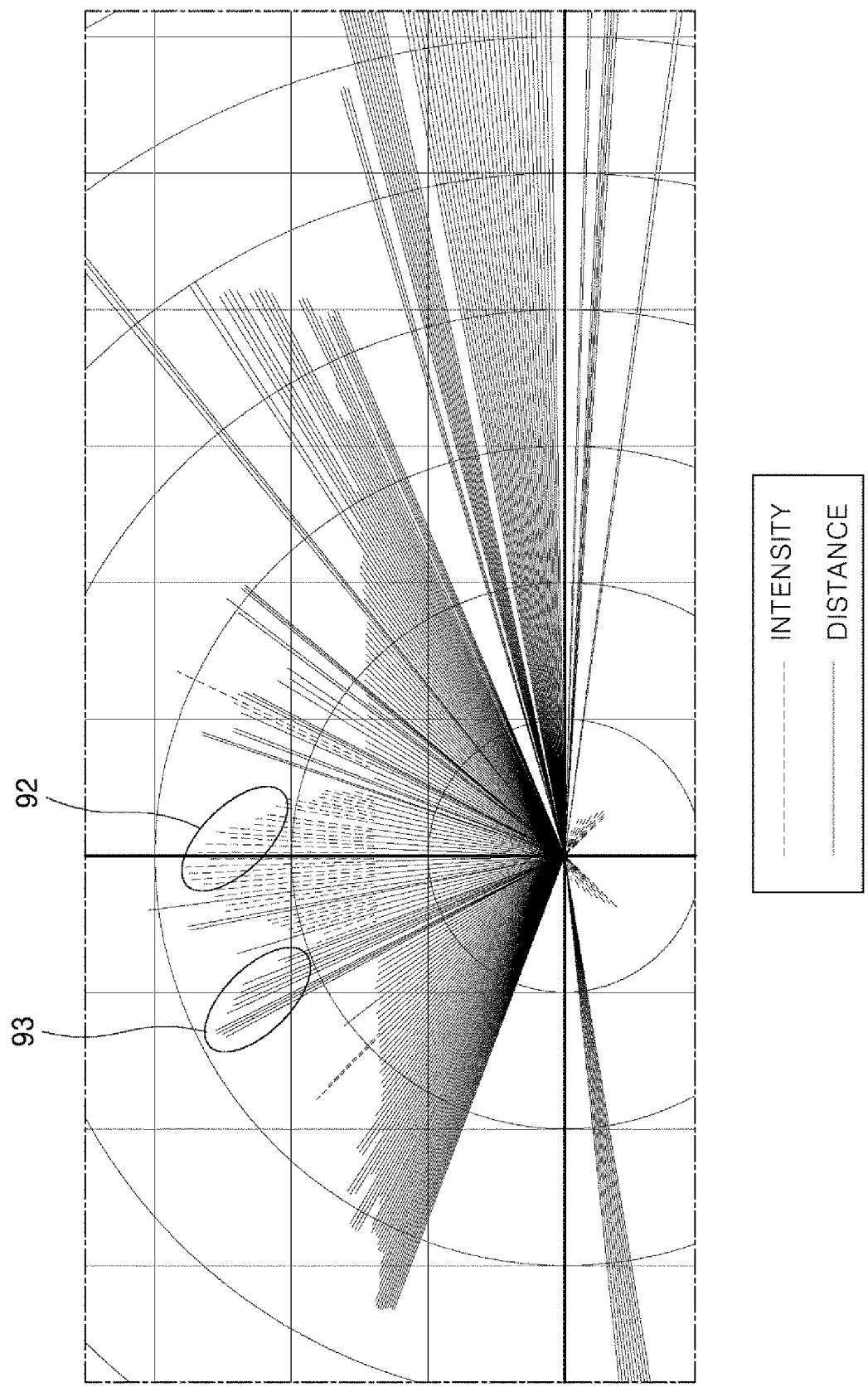
FIGS. 11 and 12 are diagrams each illustrating a result for which a sensing unit 100 of a robot according to another embodiment of the present disclosure senses both intensities and distances of signals.
Figure 12:
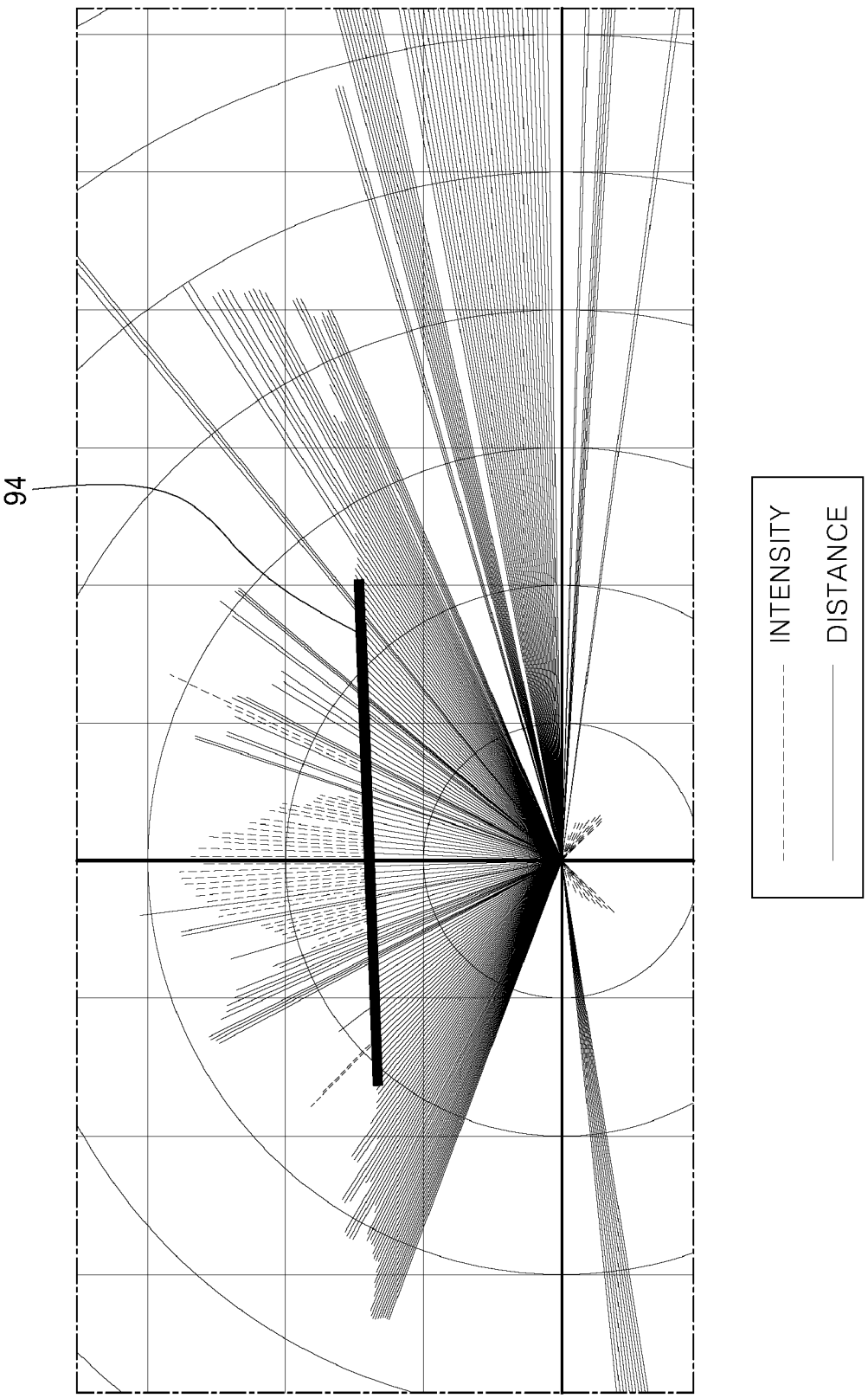

FIGS. 11 and 12 are diagrams each illustrating a result for which a sensing unit 100 of a robot according to another embodiment of the present disclosure senses both intensities and distances of signals. An area indicated by a reference numeral 92 in FIG. 11 shows an area in which intensities of signals are strong. In FIG. 11, an area indicated by a reference numeral 93 shows that the intensities of the signals are weak, and an object is provided at a long distance. However, since a width of the area 93 is not large, the area 93 may be an area in which a reflective material is provided on a wall or glass is provided. Accordingly, the controller 900 may store a wall 94 as being provided in FIG. 12 in the map storage unit 200 on the basis of the sensed data as shown in FIG. 11.

Figure 13:
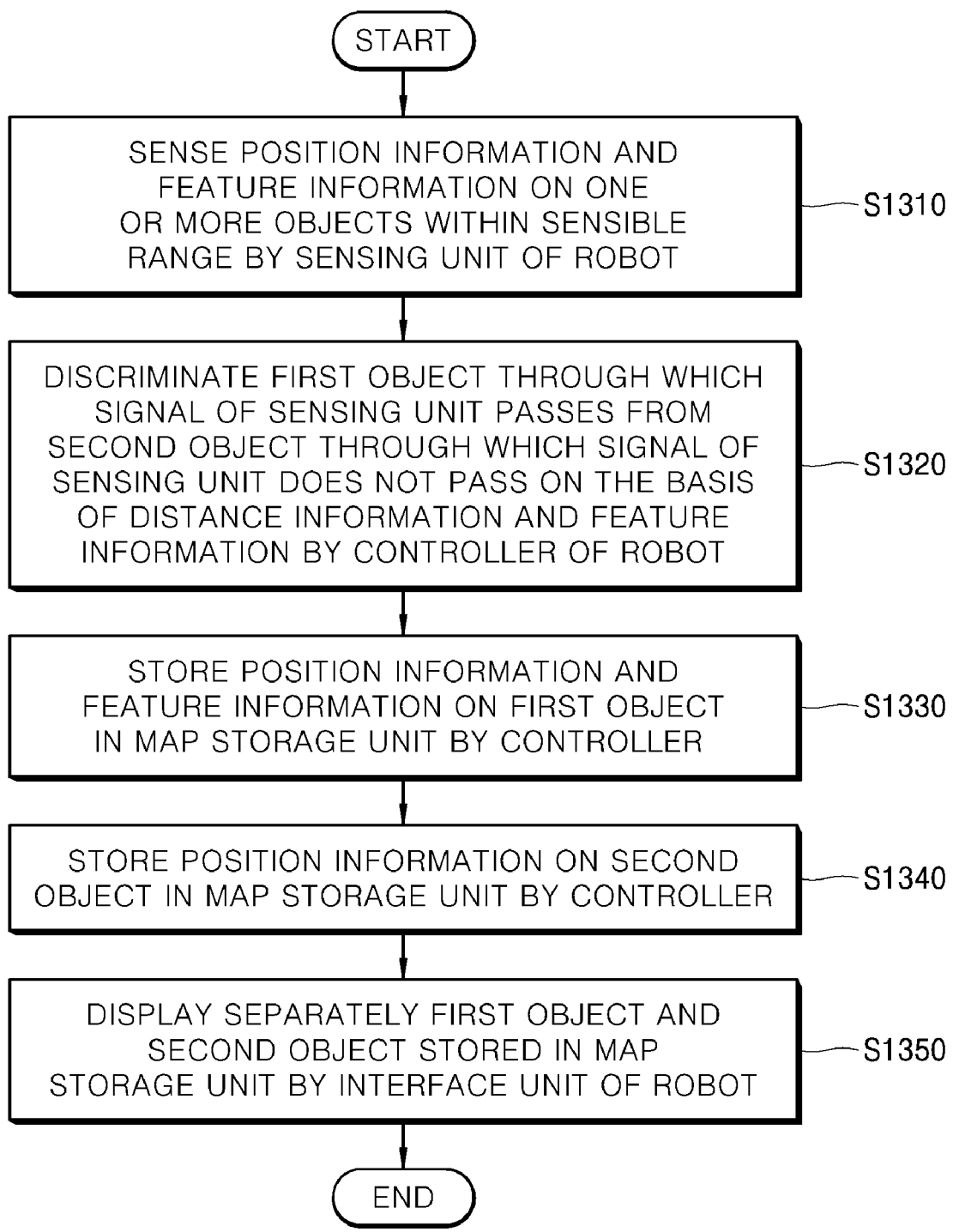
FIG. 13 is a flowchart illustrating a process in which the robot according to one embodiment of the present disclosure draws a map to which a feature of an object is applied.

FIG. 13 is a flowchart illustrating a process in which the robot 1000 according to one embodiment of the present disclosure draws a map to which a feature of an object is applied. The sensing unit 100 of the robot 1000 senses distance information and feature information on one or more objects within a sensible range (S1310). Then, the controller 900 of the robot 1000 discriminates a first object through which a signal of the sensing unit 100 passes from a second object through which the signal of the sensing unit 100 does not pass on the basis of the distance information and the feature information (S1320). As one example, the first object may be glass, and the second object may be a wall made of concrete.

Since the first object has a feature of transmittance, the controller 900 stores the position information and the feature information on the first object in the map storage unit 200 (S1330). The embodiment in which the feature information is stored is the same as that described in FIGS. 2 and 4. Then, the controller 900 stores the position information on the second object in the map storage unit 200 (S1340). Here, the feature information on the second object may be selectively stored in the map storage unit 200.

According to one embodiment of the present disclosure, the second object having a reference feature (such as a concrete wall) in the entire space may be stored as an immutable fixed object, and the first object may be stored as a variable object. As one example, when the first object is stored as a variable object, sensing time information on the first object is stored in the map storage unit 200.

Here, one example of the first object or the second object refers to an object which is provided by corresponding to a unit stored in the map storage unit 200. For example, when glass having a 1 m×1 m width is present in front of the robot 1000 and the robot 1000 stores information in a unit of 10 cm, the robot 1000 may store distance information on 10 objects, each of which has a 10 cm size, and information on intensities of sensed signals with respect to the glass having the 1 m×1 m width provided in front of the robot 1000.

As described in FIG. 9, the controller 900 may further include storing information on an imaginary object which is not sensed in the map storage unit 200 in addition to the process of FIG. 13. This refers that an imaginary wall is stored in the map such that the robot 1000 no longer enters a space in which display stands are provided. The imaginary walls may be provided to extend from adjacent walls or adjacent objects made of special materials. In FIG. 9, the embodiment in which the imaginary wall 90 is provided on the extension lines from the walls 11a and 11b has been described.

Figure 14:
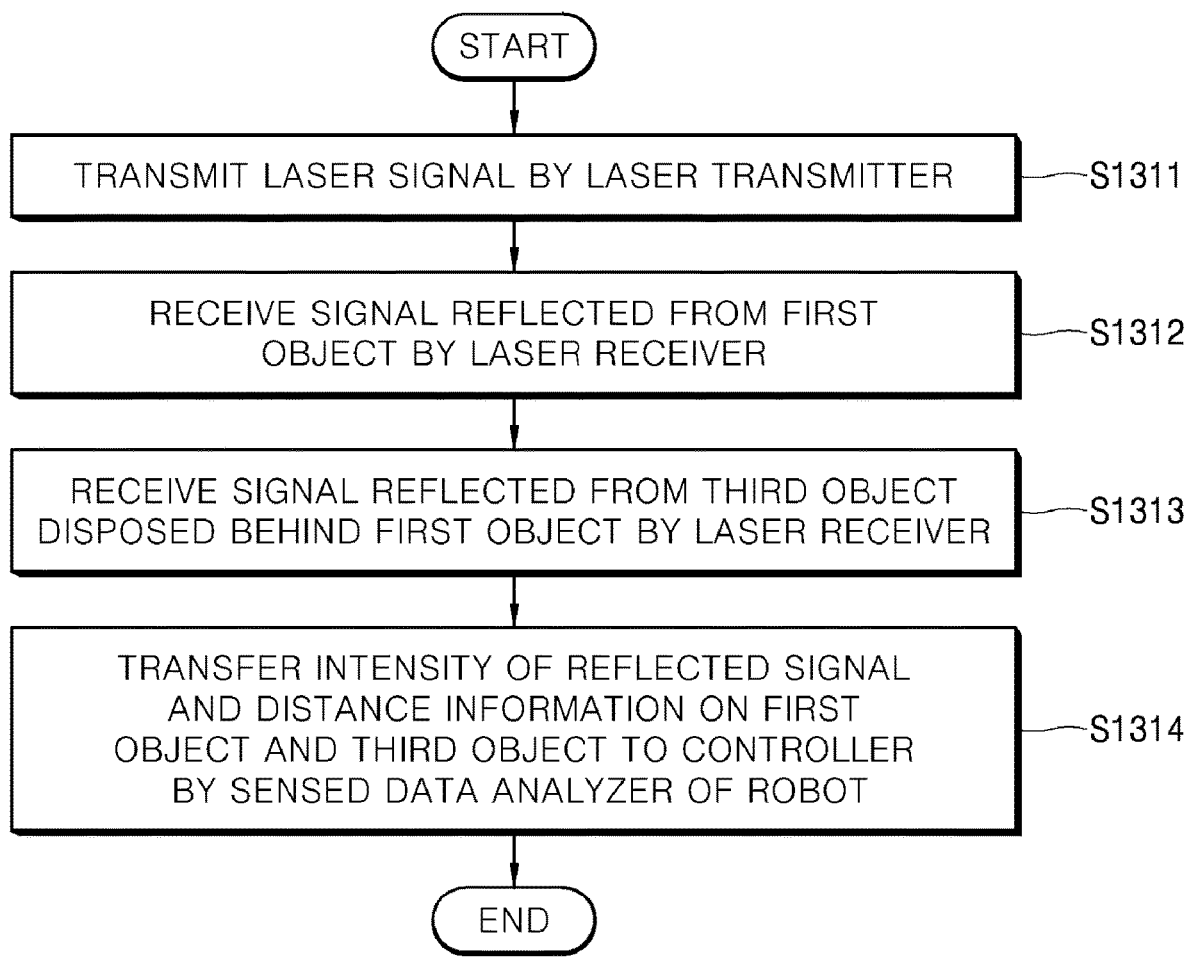
FIG. 14 is a flowchart illustrating a process in which a light detection and ranging (LiDAR) sensor according to one embodiment of the present disclosure receives a reflected signal of the object.

FIG. 14 is a flowchart illustrating a process in which the LiDAR sensor according to one embodiment of the present disclosure receives a reflected signal of the object. As described in FIG. 1, the sensing unit 100 may be the LiDAR sensor and include the laser sensor 110, the laser receiver 120, and the sensed data analyzer 130.

The laser transmitter 110 transmits a signal, i.e., a laser signal (S1311). Further, the laser receiver 120 receives the signal reflected from a first object (S1312). Then, the laser receiver 120 receives the reflected signal from a third object provided behind the first object (S1313). The first object transmits a portion of the signal like glass, and the reflected signal from the third object is a signal passing through the first object so that an intensity of the reflected signal is weak. Thus, the weak intensity of the reflected signal may be stored as a feature of the first object.

That is, the sensed data analyzer 130 of the robot 1000 transfers the intensity of the reflected signal and distance information on the first object and the third object to the controller 900 (S1314). Accordingly, the feature of the sensed object may include the intensity of the signal reflected from the first object or the third object and received by the laser receiver 120.

Figure 15:
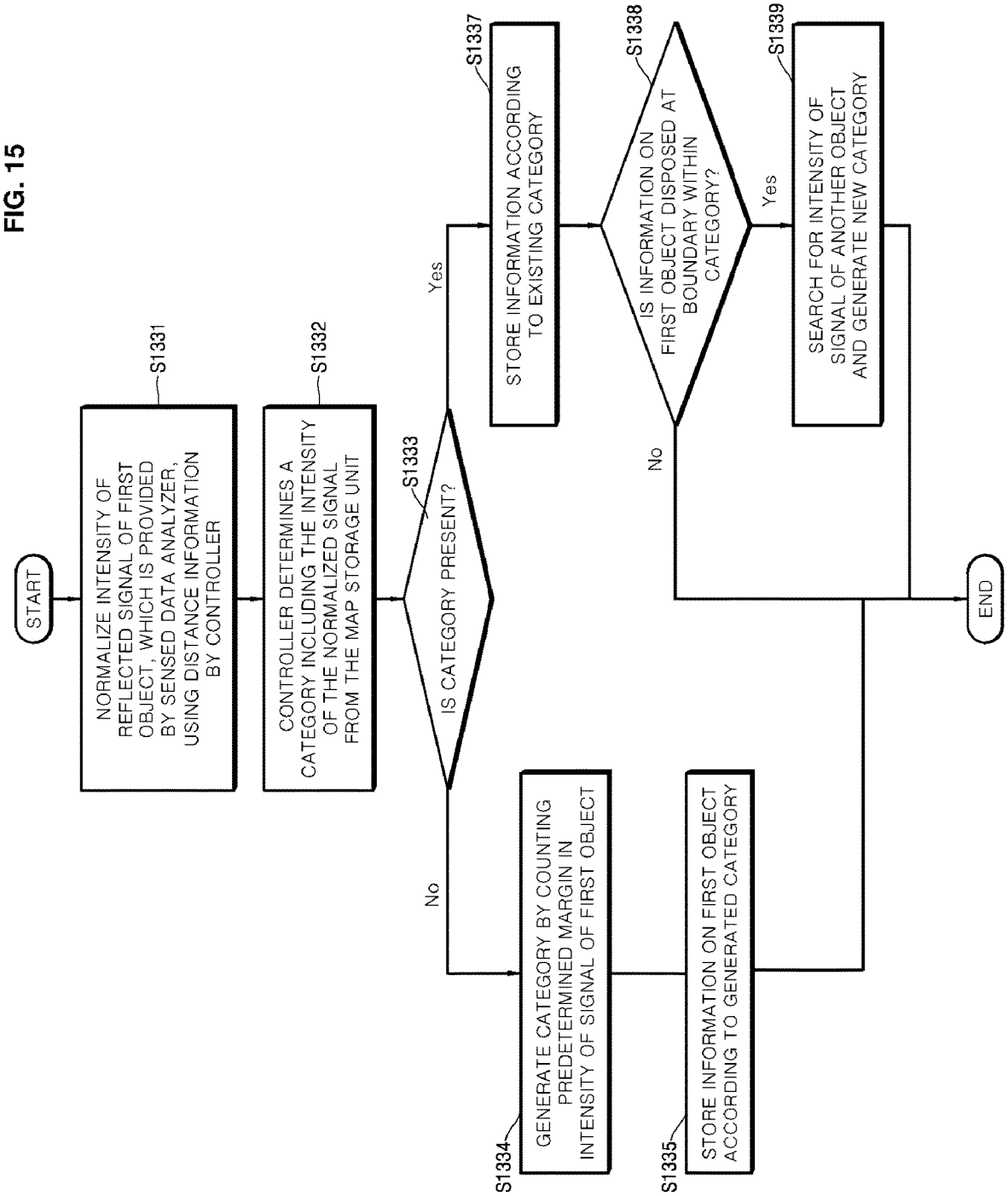
FIG. 15 is a flowchart illustrating a process in which a controller according to one embodiment of the present disclosure stores information on an external object, which is sensed, in a map storage unit.

FIG. 15 is a flowchart illustrating a process in which the controller 900 according to one embodiment of the present disclosure stores information on an external object, which is sensed, in the map storage unit 200. Describing a process of storing the information on the external object in detail, that is, the operation (S1330), the controller 900 discriminates information according to categories including the intensity of the reflected signal from the first object and stores the information on the first object in the map storage unit 200. The flowchart of FIG. 15 will be described in more detail.

The controller 900 normalizes the intensity of the reflected signal from the first object, which is provided by the sensed data analyzer 130, using the distance information (S1331). An intensity of a signal reflected from glass provided in front of the robot 1000 at 10 m differs from an intensity of a signal reflected from glass provided in front of the robot 1000 at 5 m. Further, a distance between the first object and an opaque object adjacent thereto may be referred during the normalization process.

For example, in the process of normalizing the intensity of the reflected signal from the glass indicated by the reference numeral 10 in FIG. 5, a distance to the wall 11a or 11b may be referred. However, since a space which protrudes or is recessed may be present, a distance to an adjacent object made of a different material may be referred by reflecting information on the surrounding space in which the robot 1000 is provided on the map.

Thereafter, the controller 900 determines a category including the intensity of the normalized signal from the map storage unit 200 (S1332). Whether the intensity of the signal normalized by the category storage 221 of FIG. 4 is included between Intensity_Min and Intensity_Max may be determined. When the category is present (S1333), the information on the first object is stored according to the existing category (S1337). Position information on the first object may be stored in the map 210, and the position information on the first object, information on the category, and information on the intensity of the signal may be stored in the position storage 225.

Meanwhile, the controller 900 determines whether features of intensities of signals of the objects provided in the space appropriately correspond to categories. As one example, whether the information on the first object is provided at a boundary or an intermediate position in the category is determined (S1338). For example, when the intensity of the normalized signal of the first object falls into Category 6, a case in which Category 6 is an intensity of a signal in a range of 600 to 800 is assumed. When the intensity of the signal of the first object is 601, it refers that the object is provided in a boundary area of Category 6. In this case, a new category may be generated by searching an intensity of a signal of another object from the map storage unit 200. This is an embodiment for discriminating objects which need to be distinguished from each other in the process of separately displaying the objects on a map.

As an additional embodiment of the operation (S1338) for determining whether objects are provided at the boundary, the controller 900 may calculate an average value, a variance value, or a standard deviation of intensities of signals of the objects corresponding to the category. When objects included in Category 6 are classified into a first group having an intensity of a signal in a range of 600 to 650 and a second group having an intensity of a signal in a range of 760 to 790, the objects made of different materials may be more accurately distinguished from by being classified into Category 6-1 and Category 6-2.

Meanwhile, when a category corresponding to the intensity of the signal of the object is not present in the operation (S1333), a category may be newly generated by counting a predetermined margin in the intensity of the signal of the first object (S1334). For example, when a case in which an intensity of a signal is 100 or more occurs in FIG. 4, a new category including the intensity may be added. The information on the first object is stored according to the generated category (S1335). Referring to FIG. 15, the controller 900 of the robot 1000 may reorganize categories according to feature information on objects stored in the map storage unit 200.

Figure 16:
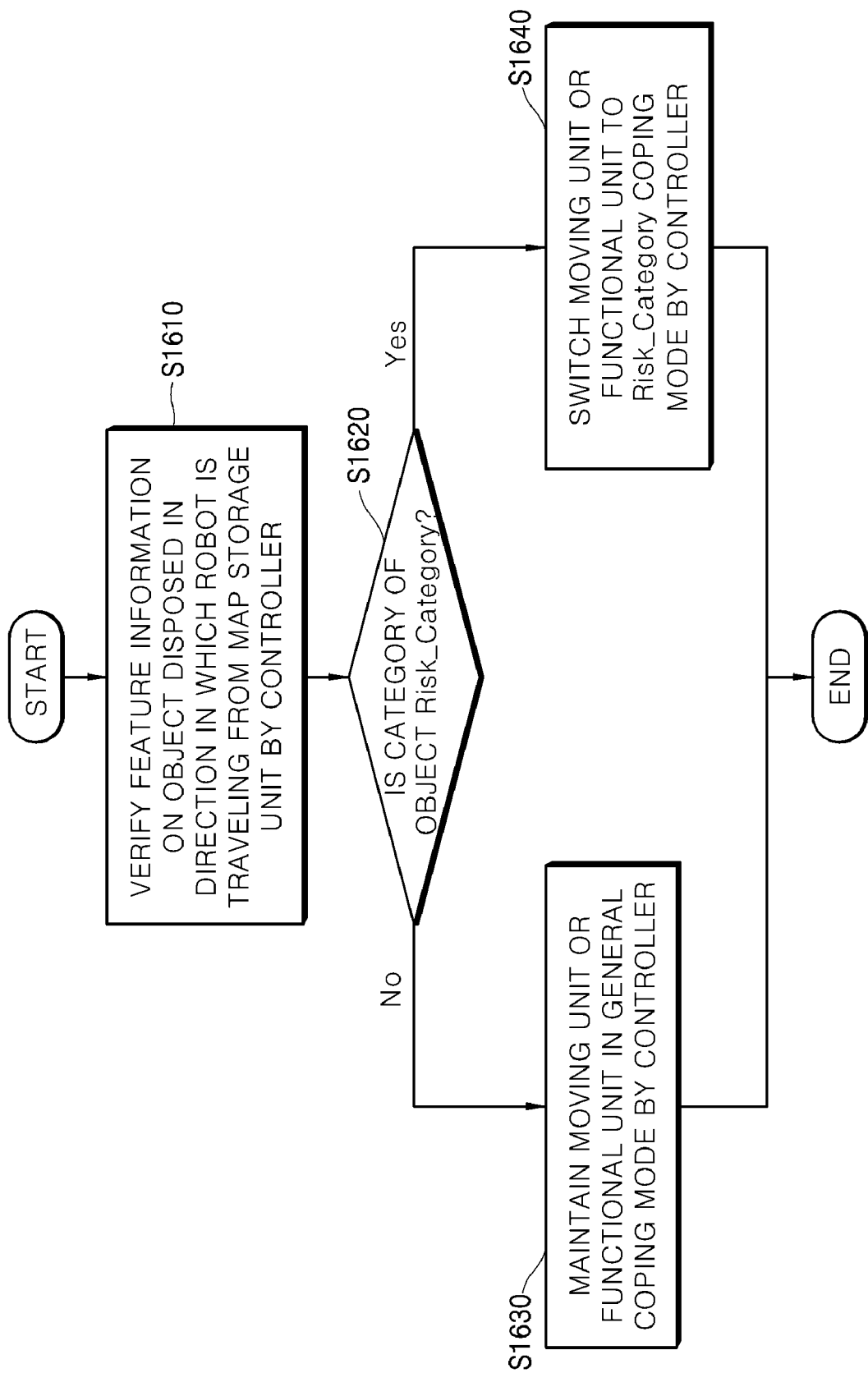
FIG. 16 is a flowchart illustrating a process in which the robot according to one embodiment of the present disclosure operates differently according to feature information of objects adjacent to the robot.

FIG. 16 is a flowchart illustrating a process in which the robot 1000 according to one embodiment of the present disclosure operates differently according to feature information of objects adjacent to the robot 1000. Hereinbefore, it has been described that the functional unit 400 or the moving unit 300 operates differently by corresponding to the feature information on the objects provided adjacent to the current position of the robot 1000. This will be described in detail below.

The controller 900 verifies feature information on an object provided in a direction in which the robot 1000 is traveling from the map storage unit 200 (S1610). Further, the controller 900 determines whether a category of the object is "Risk_Category" (S1620). As one example, "Risk_Category" is set in advance in the controller 900 or the map storage unit 200, and objects having Category 3 are included in "Risk_Category."

When the category of the object is not "Risk_Category" in the operation (S1620), the controller 900 maintains the moving unit 300 or the functional unit 400 in a general coping mode (S1630). Meanwhile, when the category of the object is "Risk_Category" in the operation (S1620), the controller 900 maintains the moving unit 300 or the functional unit 400 in a Risk_Category coping mode (S1640). As one example, the Risk_Category coping mode is a mode in which an externally provided object is determined to be a material having a possibility of damage and thus a movement speed of the robot 1000 is reduced.

Further, when the functional unit 400 performs a function of cleaning, the externally provided object is prevented from being damaged during the cleaning. For example, when a function of cleaning with a damp cloth, it refers that a rotational speed of the damp cloth is reduced, or a distance to an object recedes in a function of wall-following cleaning.

In the embodiments described herein, intensity information of a signal obtained while the LiDAR sensor senses external objects may be utilized to distinguish from the external objects with colors, patterns, numbers, or the like and display the external objects on the map such that obstacles may be distinguished from. The information on the intensity of the signal obtained for each obstacle may be utilized to perform a corresponding operation to each obstacle. Specifically, when the embodiments of the present disclosure are applied, extraction of erroneous distance information obtained from a reflective material can be prevented.

In the embodiments described herein, the controller 900 determines that a particular one of the objects may damage the robot or impede a movement of the robot, based on the position information and the feature information on the objects. And the controller 900 controls the robot to adjust at least one of a movement direction or movement speed to avoid the particular one of the objects.

Figure 17:
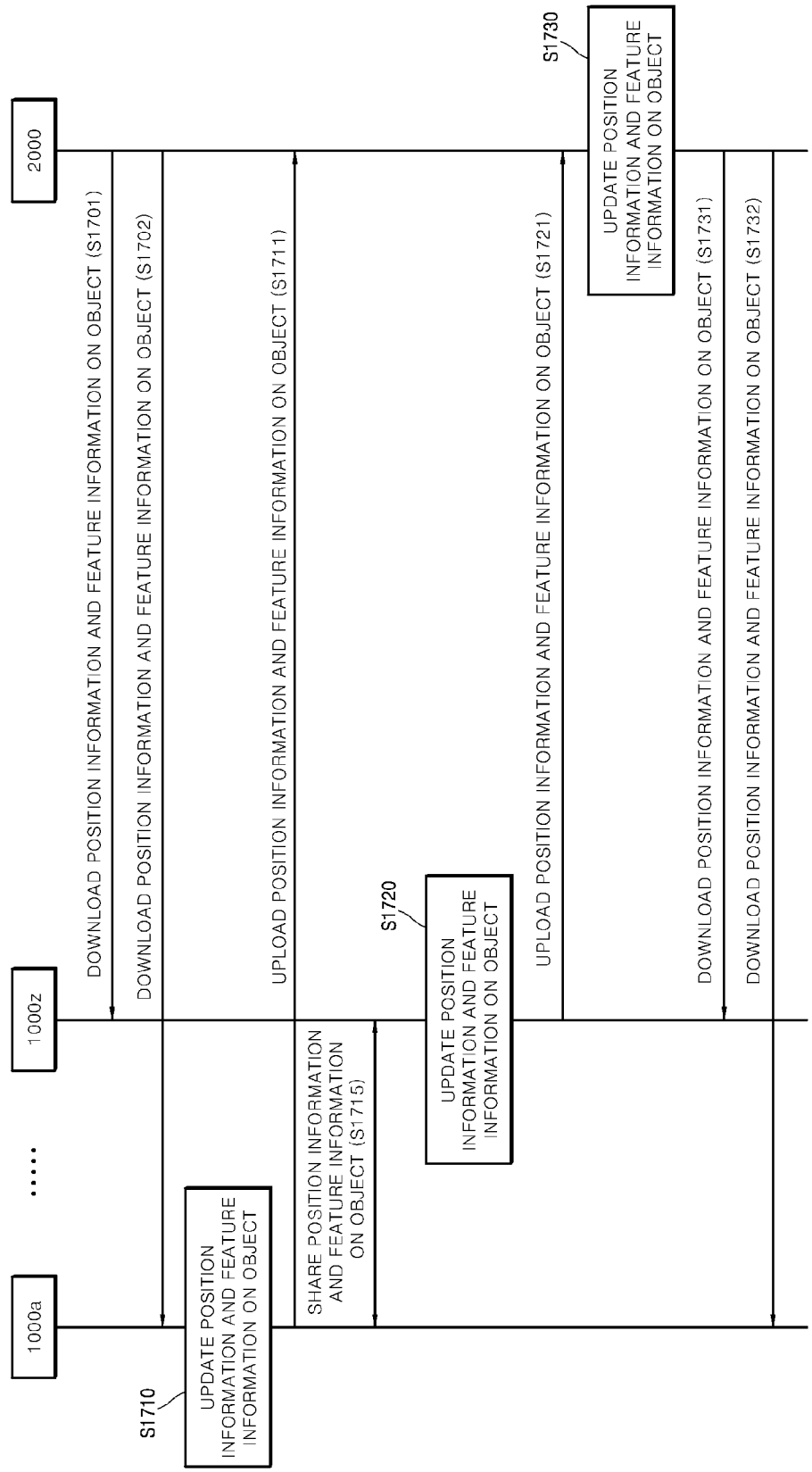
FIG. 17 is a flowchart illustrating a process of exchanging position information and feature information on an abject between a plurality of robots according to one embodiment of the present disclosure, or between the plurality of robots and a server.

FIG. 17 is a flowchart illustrating a process of exchanging position information and feature information on an abject between a plurality of robots according to one embodiment of the present disclosure, or between the plurality of robots and a server. A server (or computer) 2000 downloads and transmits position information and feature information on an object to a plurality of robots 1000a, . . . , 1000z (S1701 and S1702). The plurality of robots 1000a, . . . , 1000z update the received position information and the received feature information on the object to the map storage unit 200. The server 2000 analyzes position information and feature information on the object transmitted by the plurality of robots 1000a, . . . , 1000z and newly updates the sensed duplicate information at the same position to store the position information and the feature information on the object. Further, sensed time information SensingTime may be stored as described in FIG. 4, and whether the sensed object is removed from a specific position may be determined on the basis of the sensed time information. When a fake wall(i.e., temporary wall) is configured with glass, after the fake wall is removed, the glass wall is removed from the map storage unit 200 to allow the plurality of robots 1000a, . . . , 1000z to move. Then, the plurality of robots 1000a, . . . , 1000z update the position information and the feature information on the object while traveling (S1710 and S1720). As one example, updating the information of the map storage unit provided in each robot is included. Further, position information and feature information on the object, which are newly obtained, may be shared between adjacent robots among the plurality of robots 1000a, . . . , 1000z (S1715). At this point, the sharing of the position information and the feature information on the object may be limitedly provided to only adjacent robots within a predetermined range. Alternatively, the sharing may be provided to a robot which is scheduled to move to a corresponding space.

Further, each of the plurality of robots 1000a, . . . , 1000z uploads and transmits the position information and the feature information on the object, which are obtained while traveling, to the server 2000 (S1711 and S1721). The server 2000 updates the received position information and the received feature information (S1730), and during this process, the server 2000 may organize duplicate information as information on a single object, or, when variation occurs in the feature information (the normalized intensity of the signal) on the object, the server 2000 may reflect the variation to newly download position information and feature information on the object (S1731 and S1732).

In accordance with the embodiments of the present disclosure, a map can be accurately drawn by reflecting a feature of a material of an obstacle in the process of drawing or modifying the map using a sensor. Further, in accordance with the embodiments of the present disclosure, object information can be accurately sensed according to the material of the obstacle, and information on obstacles of materials different from each other can be distinguished from to be stored and displayed on the map. Furthermore, in accordance with the embodiments of the present disclosure, the robot can operate differently according to features of objects adjacent to the robot.

Although the features and elements are described in particular combinations in the exemplary embodiments of the present disclosure, each feature or element can be used alone or in various combinations with or without other features and elements. In addition, although each of the features and elements may be implemented as an independent hardware component, some or all of the features and elements may be selectively combined into one or more hardware components with a computer program having a program module that causes the hardware components to perform some or all of the functionality described herein. Codes and code segments of such a computer program will be easily conceivable by those skilled in the art. Such a computer program is stored on a computer-readable storage medium and may be read/executed by a computer to thereby implement the exemplary embodiments of the present disclosure. The storage medium of the computer program includes a magnetic storage medium, an optical storage medium, a semiconductor storage device, etc. Further, the computer program implementing the exemplary embodiments of the present disclosure includes a program module transmitted in real-time via an external device.

It is an aspect of the present disclosure to provide a method for sensing a feature of each of objects in a space in which the objects of various materials are provided, drawing a map on the basis of on the sensed features, and allowing a robot to move using the map. In this disclosure, accurate map information can be generated by preventing a case in which an erroneous value is obtained or not obtained according to a material of an obstacle. In this disclosure, the features of the objects can be reflected in the process of designing a movement of the robot by separately displaying the objects on the map according to the material of the obstacle.

Aspects of the present disclosure are not limited to the above-described aspects, and other aspects and features can be appreciated by those skilled in the art from the following descriptions. Further, it will be easily appreciated that the aspects of the present disclosure can be practiced by means recited in the appended claims and a combination thereof.

In accordance with one aspect of the present disclosure, there is provided a robot drawing a map to which feature of an object is applied, which comprises a moving unit configured to control a movement of the robot; a map storage unit configured to store the map to be referred while the robot moves; a sensing unit configured to sense one or more objects provided outside the robot; and a controller configured to control the moving unit, the map storage unit, and the sensing unit, and calculate position information and feature information on the one or more sensed objects, wherein the controller of the robot stores the position information and the feature information of the one or more sensed objects in the map storage unit.

In accordance with another aspect of the present disclosure, there is provided a method for drawing a map to which a feature of an object is applied, which comprises sensing position information and feature information on one or more objects within a sensible range by a sensing unit of a robot; distinguishing a first object through which a signal of the sensing unit passes from a second object through which the signal of the sensing unit does not pass on the basis of the position information and the feature information by a controller of the robot; storing position information and feature information on the first object in a map storage unit by the controller; and storing position information on the second object in the map storage unit by the controller.

The effects of the present disclosure are not limited to the above-described effects, and those skilled in the art to which the present disclosure pertains can easily derive various effects of the present disclosure from the configuration thereof. Although the exemplary embodiments of the present disclosure have been described for illustrative purposes, those skilled in the art will appreciate that various modifications, additions and substitutions are possible without departing from the scope and spirit of the present disclosure. Accordingly, it will be understood that such modifications, additions and substitutions also fall within the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a motor configured to selectively apply a force to move the robot;
   a memory configured to store a map of a space;
   a sensor configured to scan objects located outside the robot in the space, the objects including a first object, a second object, and a third object; and
   a controller configured to:
      calculate position information and feature information on the objects,
      distinguish between the first object through which a signal of the sensor passes from the second object through which the signal of the sensor does not pass based on the position information and the feature information;
      store the position information and the feature information of the objects in the memory, and
      control the motor to move the robot through the space based on the map, the position information, and the feature information,
   wherein the first object is positioned between the robot and the third object, the sensor includes a light detection and ranging (LiDAR) sensor, and the LiDAR sensor includes a laser transmitter, a laser receiver, and a sensed data analyzer, and
   wherein
      the laser transmitter is configured to transmit the signal,
      the laser receiver is configured to receive a first reflection of the signal from the first object and a second reflection of the signal from the third object, and
      the sensed data analyzer is configured to compare an intensity of the first reflection and position information on the first object to an intensity of the second reflection and position information on the third object.

2. The robot of claim 1, wherein the memory includes:
   a map storage configured to store information on the space in which the robot moves; and
   an object feature storage configured to store a feature of one of the objects provided in the space.

3. The robot of claim 1, wherein:
   the feature information of the objects include respective intensities of the reflections received by the laser receiver.

4. The robot of claim 3, wherein the controller separates the objects into categories based on the intensities of the reflections therefrom, and
   the robot further comprises a user interface configured to separately display information on the objects stored in the memory according to the categories, including the intensities of the reflections.

5. The robot of claim 1, wherein the controller stores, in the memory, information on an imaginary object that is identified in the map and not sensed.

6. The robot of claim 1, wherein:
   the robot is configured to perform a preset function, and
   the robot operates differently based on the feature information for at least one object, of the objects, that is adjacent to a current position of the robot.

7. The robot of claim 1, wherein the memory further stores information on categories of the objects, and
   the controller of the robot reorganizes the categories according to the feature information on the objects stored in the memory.

8. A method to control a robot, the method comprising:
detecting, by sensor, position information and feature information on objects within a sensible range of the sensor, the objects including a first object and a second object;
distinguishing, by a controller, between the first object through which a signal of the sensor passes from the second object through which the signal of the sensor does not pass based on the position information and the feature information;
storing, in a memory, the position information and the feature information on the first object; and
storing, in the memory, position information on the second object,
wherein:
  the objects further include a third object,
  the first object is positioned between the robot and the third object,
  the sensor includes a light detection and ranging (LiDAR) sensor,
  the LiDAR sensor includes a laser transmitter, a laser receiver, and a sensed data analyzer, and
  sensing the position information and the feature information includes:
    transmitting the signal by the laser transmitter;
    receiving a first reflection of the signal from the first object by the laser receiver;
    receiving a second reflection of the signal from the third object by the laser receiver; and
    comparing an intensity of the first reflection and position information on the first object to an intensity of the second reflection and position information on the third object by the sensed data analyzer.

9. The method of claim 8, wherein the detected feature information identifies at least one of the intensity of the first reflection from the first object or the intensity of the second reflection from the third object.

10. The method of claim 8, wherein the storing of the position information and the feature information on the first object in the memory includes distinguishing from and storing information on the first object in the memory according to a category corresponding to the intensity of the first reflection from the first object.

11. The method of claim 8, further comprising:
separately displaying stored information for at least two of the objects on a user interface of the robot.

12. The method of claim 8, further comprising:
storing information on an imaginary object that that is identified in the map and not sensed.

13. The method of claim 8, wherein:
the robot is configured to perform a preset function, and
the method further comprises:
  determining stored feature information on an object positioned adjacent to a current location; and
  setting an operational mode of the robot based on the feature information.

14. The method of claim 13, wherein the preset function is a cleaning function, and the present function relates to cleaning a surface on which the robot is traveling.

15. The method of claim 8, wherein:
the memory further stores information on categories of the objects, and
the method further comprises:
  reorganizing the categories according to the feature information for one of the objects.

16. The method of claim 8, further comprising:
controlling a movement of the robot through a space based on the position information and the feature information for the objects.

17. The method of claim 16, further comprising:
storing a map of the space; and
updating the map based on the position information and the feature information for the objects.

18. The method of claim 8, further comprising:
determining, based on the position information and the feature information on the objects, that a particular one of the objects may damage the robot or impede a movement of the robot; and
control the robot to adjust at least one of a movement direction or a movement speed to avoid the particular one of the objects.

19. The method of claim 8, further comprising:
transmitting at least a portion of the position information and the feature information on the objects to at least one of another robot or a computer.

* * * * *